US012216986B2

(12) United States Patent
Patel et al.

(10) Patent No.: US 12,216,986 B2
(45) Date of Patent: Feb. 4, 2025

(54) COMPUTER IMPLEMENTED ACCESSIBILITY SYSTEMS AND METHODS

(71) Applicant: INNsight.com, Inc., San Francisco, CA (US)

(72) Inventors: Rajesh B. Patel, San Francisco, CA (US); Roshan B. Patel, San Francisco, CA (US)

(73) Assignee: INNsight.com, Inc., San Francisco, CA (US)

( * ) Notice: Subject to any disclaimer, the term of this patent is extended or adjusted under 35 U.S.C. 154(b) by 0 days.

(21) Appl. No.: 16/855,980

(22) Filed: Apr. 22, 2020

(65) Prior Publication Data

US 2020/0334411 A1  Oct. 22, 2020

Related U.S. Application Data

(60) Provisional application No. 62/837,111, filed on Apr. 22, 2019.

(51) Int. Cl.
*G06F 40/143* (2020.01)
*G06F 40/58* (2020.01)
*H04L 67/10* (2022.01)

(52) U.S. Cl.
CPC ............ *G06F 40/143* (2020.01); *G06F 40/58* (2020.01); *H04L 67/10* (2013.01)

(58) Field of Classification Search
CPC .. G06F 40/142; G06F 16/9577; G06F 40/143; G06F 8/70; H04L 67/10

(Continued)

(56) References Cited

U.S. PATENT DOCUMENTS 6,121,968 A * 9/2000 Arcuri ................... G06F 3/0482
                                                        715/825
6,232,972 B1 * 5/2001 Arcuri ..................... G06F 9/453
                                                        715/815

(Continued)

OTHER PUBLICATIONS

Hanson, V.L. et al., "Personalization of Web Browsing: Adaptations to Meet the Needs of Older Adults," Univ. Access Inf. Soc (2005) 4: 46-58.*

(Continued)

*Primary Examiner* — James T Tsai
(74) *Attorney, Agent, or Firm* — Mahesh Law Group PC; Kumar Maheshwari

(57) ABSTRACT

One or more computer programs can be configured to perform particular operations or actions by virtue of including instructions that, when executed by data processing apparatus, cause the apparatus to perform the actions. One general aspect includes a method for modifying a display, the method including: receiving, by a host server, a request for an accessibility component from a web page server. The method also includes receiving, by the host server, a web page component, from the web page server. The method also includes transmitting, by the host server, the accessibility component to the web page server. The method also includes where the accessibility component is configured to modify a web page content based on user input received at the host computer. Other embodiments of this aspect include corresponding computer systems, apparatus, and computer programs recorded on one or more computer storage devices, each configured to perform the actions of the methods.

20 Claims, 31 Drawing Sheets

(58) Field of Classification Search
USPC ................................................. 715/234, 825
See application file for complete search history.

(56) References Cited

U.S. PATENT DOCUMENTS

| | | | | |
|---|---|---|---|---|
| 6,300,947 | B1* | 10/2001 | Kanevsky | G06F 16/9577 |
| | | | | 715/866 |
| 6,621,532 | B1* | 9/2003 | Mandt | G06F 3/0482 |
| | | | | 348/841 |
| 7,010,581 | B2* | 3/2006 | Brown | G06F 3/0481 |
| | | | | 709/218 |
| 7,523,191 | B1* | 4/2009 | Thomas | G06F 11/3438 |
| | | | | 709/202 |
| 9,268,753 | B2* | 2/2016 | Hendry | G06F 40/143 |
| 9,773,247 | B1* | 9/2017 | Keld | G06Q 20/405 |
| 11,256,776 | B2* | 2/2022 | Eliav | G06F 40/143 |
| 2002/0065658 | A1* | 5/2002 | Kanevsky | G06F 16/9574 |
| | | | | 704/260 |
| 2002/0138616 | A1* | 9/2002 | Basson | H04L 67/2814 |
| | | | | 709/225 |
| 2003/0061299 | A1* | 3/2003 | Brown | H04L 67/565 |
| | | | | 709/219 |
| 2003/0061309 | A1* | 3/2003 | Brown | H04L 67/2804 |
| | | | | 709/218 |
| 2004/0268360 | A1* | 12/2004 | Atkin | G06F 16/957 |
| | | | | 707/E17.119 |
| 2005/0246653 | A1* | 11/2005 | Gibson | G06F 16/957 |
| | | | | 707/E17.119 |
| 2007/0180386 | A1* | 8/2007 | Ballard | G06F 16/9577 |
| | | | | 715/744 |
| 2008/0052639 | A1* | 2/2008 | Chun | G06F 16/9537 |
| | | | | 715/810 |
| 2009/0150830 | A1* | 6/2009 | Ban | G06F 3/0482 |
| | | | | 715/843 |
| 2010/0205523 | A1* | 8/2010 | Lehota | G06F 16/9577 |
| | | | | 715/235 |
| 2011/0271219 | A1* | 11/2011 | Krishnan | G16H 40/40 |
| | | | | 715/771 |
| 2012/0011570 | A1* | 1/2012 | Griffin | G06Q 10/063114 |
| | | | | 726/4 |
| 2012/0047438 | A1* | 2/2012 | Wahl | G06Q 10/10 |
| | | | | 715/733 |
| 2012/0140255 | A1* | 6/2012 | Tanaka | G06F 3/04817 |
| | | | | 358/1.13 |
| 2013/0073949 | A1* | 3/2013 | Barrell | G06F 16/9577 |
| | | | | 715/234 |
| 2013/0104029 | A1* | 4/2013 | Hendry | G06F 40/117 |
| | | | | 715/234 |
| 2014/0310395 | A1* | 10/2014 | Chakra | H04L 67/02 |
| | | | | 709/224 |
| 2014/0344665 | A1* | 11/2014 | Fernandez | G06F 16/9577 |
| | | | | 715/234 |
| 2015/0106686 | A1* | 4/2015 | Blitzstein | G06F 40/14 |
| | | | | 715/234 |
| 2015/0205462 | A1* | 7/2015 | Jitkoff | G06F 16/955 |
| | | | | 715/777 |
| 2015/0287043 | A1* | 10/2015 | Michaelis | G06Q 10/10 |
| | | | | 705/317 |
| 2015/0363554 | A1* | 12/2015 | Farrell | G16H 10/60 |
| | | | | 705/3 |
| 2015/0378575 | A1* | 12/2015 | Kaplinger | G06F 9/451 |
| | | | | 715/760 |
| 2016/0246490 | A1* | 8/2016 | Cabral | G06F 3/0481 |
| 2017/0230470 | A1* | 8/2017 | Ravishankar | G09B 21/009 |
| 2017/0255455 | A1* | 9/2017 | Collier | G06F 11/3438 |
| 2017/0269816 | A1* | 9/2017 | Bradley | G10L 15/22 |
| 2018/0024845 | A1* | 1/2018 | Card, II | G06F 3/167 |
| | | | | 715/719 |
| 2019/0278825 | A1* | 9/2019 | Eliav | G06F 40/151 |
| 2020/0082939 | A1* | 3/2020 | Dill | G16H 15/00 |

OTHER PUBLICATIONS

Richards, J.T., "Accessibility Works: Enhancing Web Accessibility in Firefox," C. Stephanidis (Ed.): Universal Access in HCI, Part III, HCII 2007, LNCS 4556, pp. 133-141, 2007. © Springer-Verlag Berlin Heidelberg 2007.*

Mirri, S. et al., "Augment Browsing and Standard Profiling for Enhancing Web Accessibility," Publication: W4A '11: Proceedings of the International Cross-Disciplinary Conference on Web AccessibilityMar. 2011 Article No. 5 pp. 1-10.*

Watool Web Accessibility Toolbar website downloaded Dec. 20, 2020 , http://www.web-accessibility-toolbar.com, 4 pages.*

Rivenburgh, K., Toolbar Plugins/Widgets for Website Accessibility Aren't ADA/508 Compliant, Oct. 7, 2019, downloaded from https://medium.com/@krisrivenburgh/toolbar-plugins-widgets-for-website-accessibility-arent-ada-508-compliant-7e7b649e20ba, 22 pages.*

Xiao, G. et al., "iBrowse: Software for Low Vision to Access Internet," IEEE, 2010, pp. 2062-2066.*

Hanson, V.L. et al., "Improving Web Accessibility Though an Enhanced Open-Source Browser," IBM Systems Journal, vol. 44, No. 3, 2005, pp. 573-588.*

De Santana, V.F. et al., "Firefixia: An accessibility web browser customization toolbar for people with dyslexia," W4A2013—Communication, May 13-15, 2013, Rio de Janeiro, Brazil. Copyright 2013 ACM.*

Mangiatordi, A. et al., "Farfalla Project: Browser-based Accessibility Solutions," Jan. 2011, ACM 3 pages total.*

Nunez, O.H. et al., "Web Accessibility Toolbar: Allyxe (Accessibility for Everyone)," 2015, IEEE (English Translation by Google Translate), 8 pages total.*

Nunez, O.H. et al., "Web Accessibility Toolbar: Allyxe (Accessibility for Everyone)," 2015, IEEE (Original), 8 pages total.*

ATbar web page (2011), 3 pages.*

Lambert, J.,"Chapter 4: Microsoft Word Step by Step," (2015), Microsoft Press, pp. 1-46 of 46.*

Mulfari et al., 2013. How cloud computing can support on-demand assistive services. In Proceedings of the 10th International Cross-Disciplinary Conference on Web Accessibility (W4A '13). pp. 1-4. (Year: 2013).*

Wai Yu, Graham McAllister, Philip Strain, Ravi Kuber, and Emma Murphy. 2005. Improving web accessibility using content-aware plug-ins. In CHI '05 Extended Abstracts on Human Factors in Computing Systems (CHI EA '05). Association for Computing Machinery, New York, NY, USA, 1893-1896. (Year: 2005).*

M. Wald, E. A. Draffan, S. Skuse, R. Newman, and C. Phethean. 2011. Southampton accessibility tools. In Proceedings of the International Cross-Disciplinary Conference on Web Accessibility (W4A '11). Association for Computing Machinery, New York, NY, USA, Article 23, 1-2. (Year: 2011).*

Hironobu Takagi and Chieko Asakawa. 2000. Transcoding proxy for nonvisual web access. In Proceedings of the fourth international ACM conference on Assistive technologies (Assets '00). Association for Computing Machinery, New York, NY, USA, 164-171. (Year: 2000).*

A. Garrido, S. Firmenich, G. Rossi, J. Grigera, N. Medina-Medina and I. Harari, "Personalized Web Accessibility using Client-Side Refactoring," in IEEE Internet Computing, vol. 17, No. 4, pp. 58-66, Jul.-Aug. 2013 (Year: 2013).*

Chalamandaris, A. et al., (2009). Enhancing accessibility of web content for the print-impaired and blind people. In HCI and Usability for e-Inclusion: 5th Symp. Workgroup Human-Computer Interaction . . . , Linz, Austria, Nov. 9-10, 2009 Nov. 9-10, 2009 Proceedings 5 (pp. 249-263).*

* cited by examiner

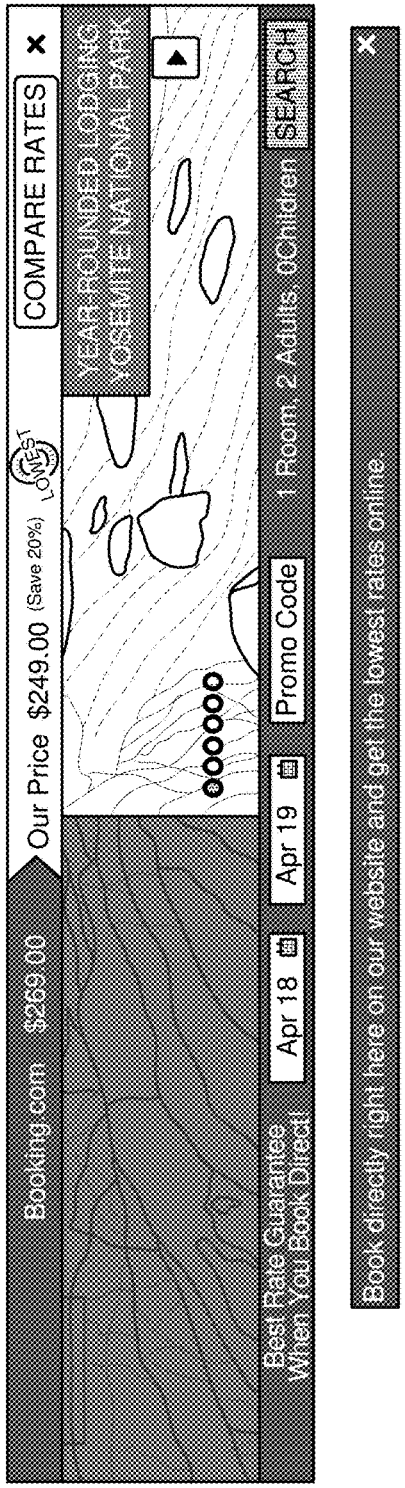
Fig. 5

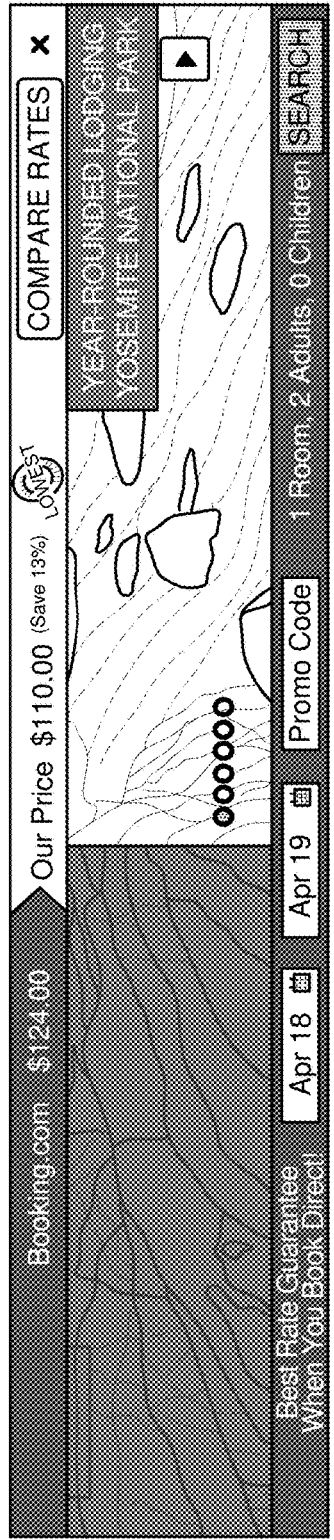
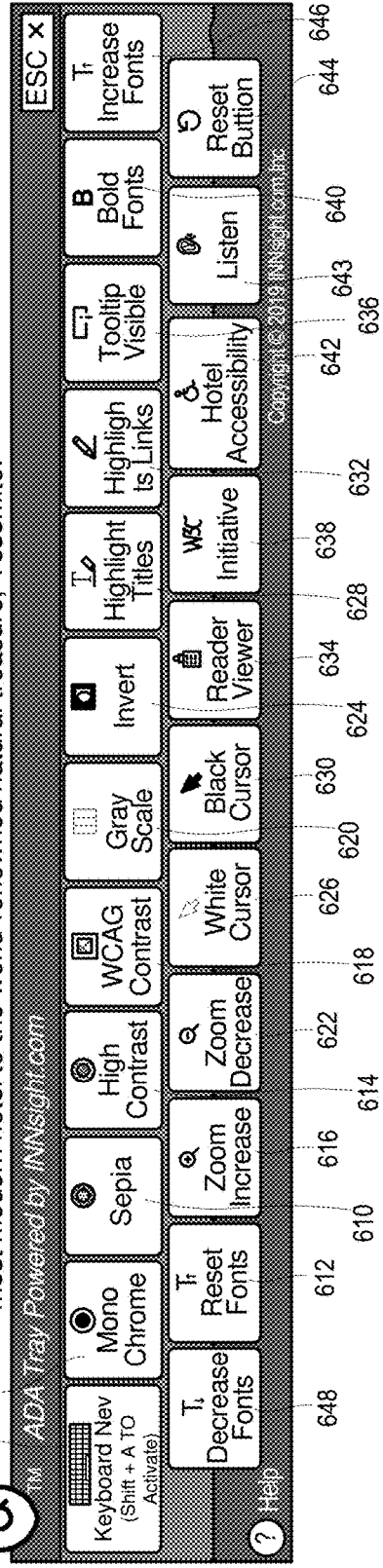
Fig. 6

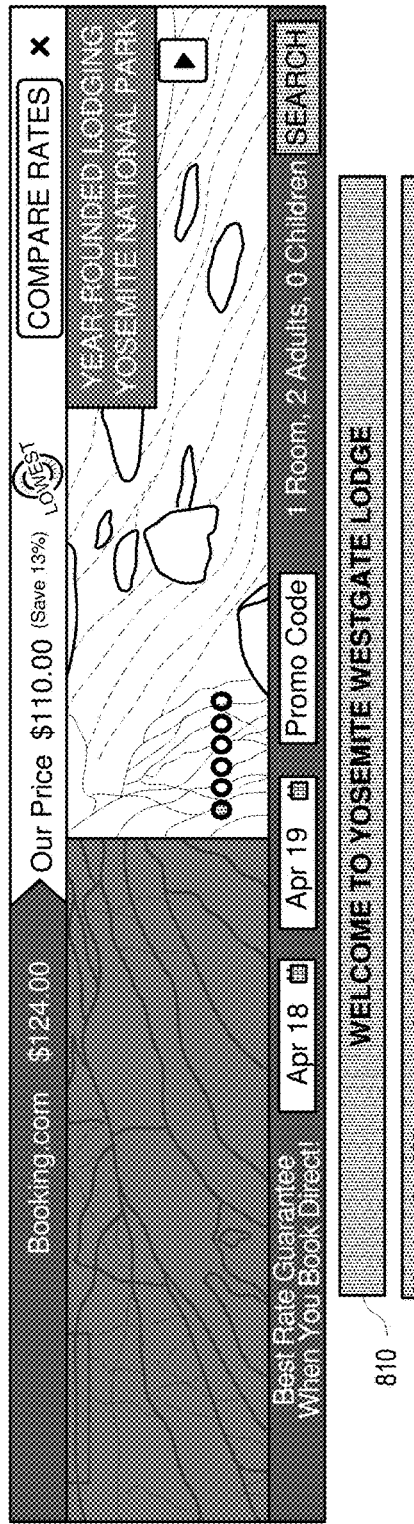
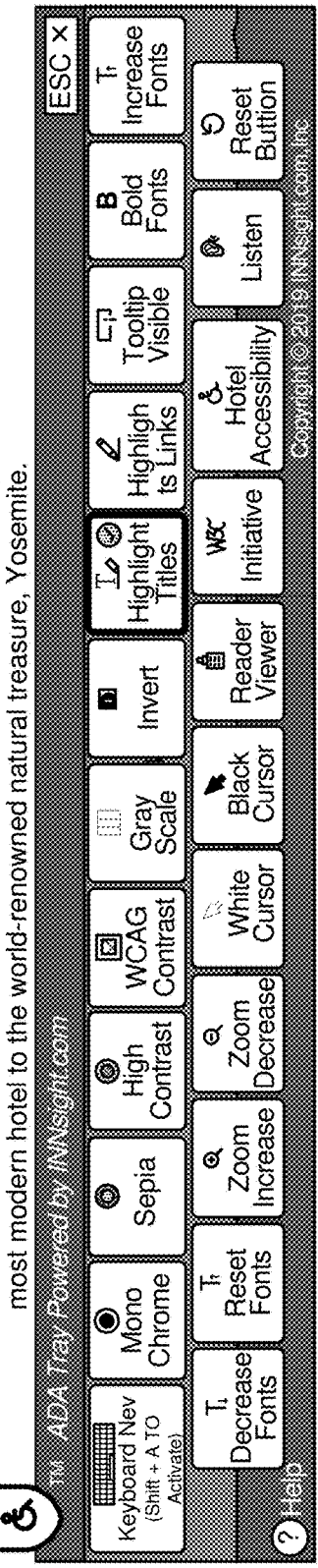
Fig. 8

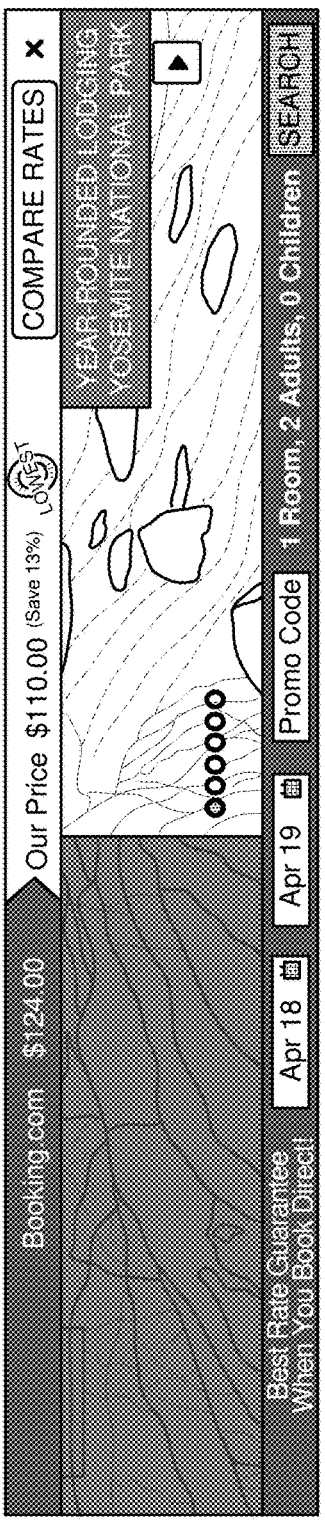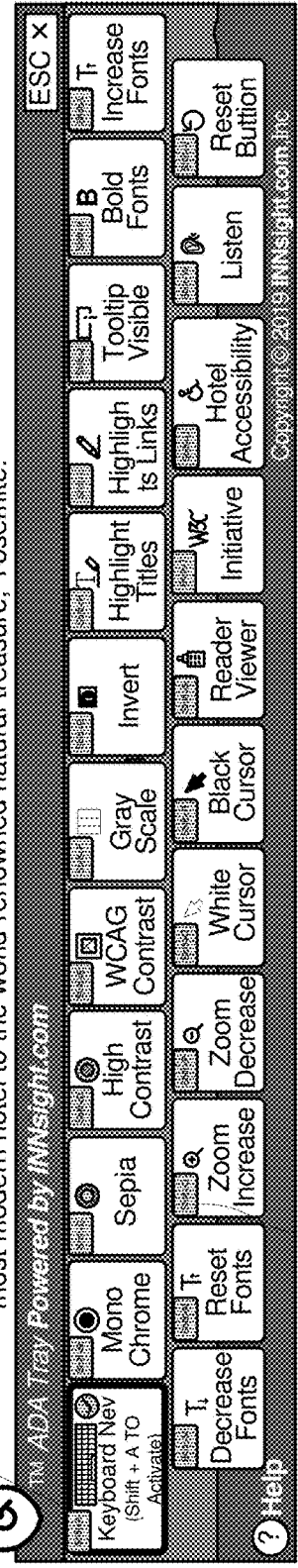
Fig. 10

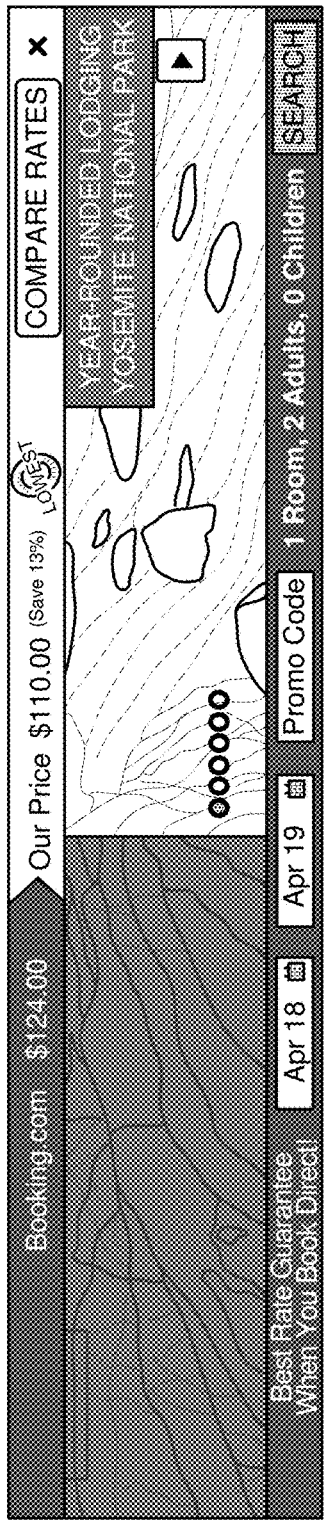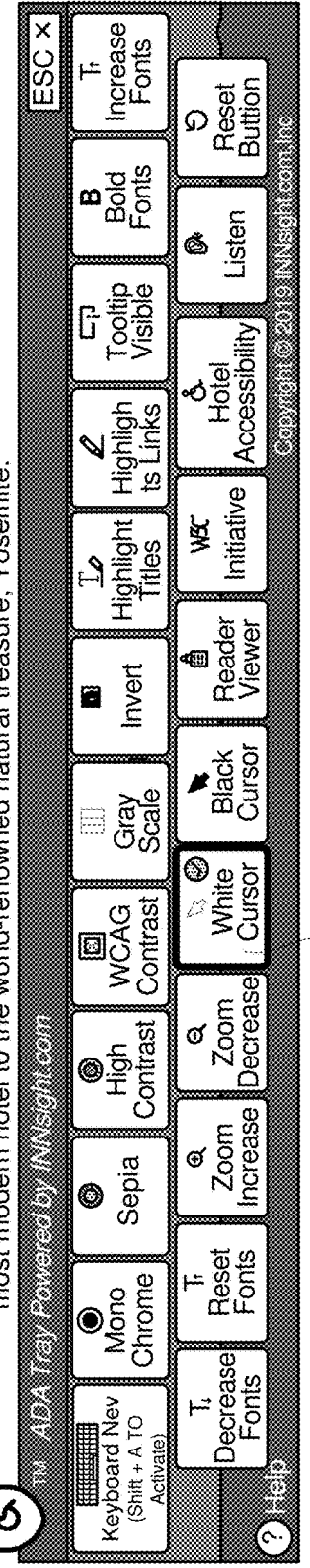
Fig. 11

COMPUTER IMPLEMENTED ACCESSIBILITY SYSTEMS AND METHODS

CROSS-REFERENCE TO RELATED APPLICATIONS

This application claims the benefit of U.S. Provisional Application No. 62/837,111 titled "Computer Implemented Accessibility Systems and Methods" which was filed on Apr. 22, 2019.

FIELD OF THE INVENTION

The invention relates generally to increasing the accessibility of interfaces for individuals with impairments.

BACKGROUND

The proposed subject matter describes systems and methods for making websites more accessible for individuals, who might face audio, visual, or mobility impairment. The law requires certain websites to be accessible to users with disabilities. And while it is already expensive to create and maintain a website, making that website accessible to those with impairments can be daunting. There is a need in the art for an easier way to make any website accessible to those with audio, visual, or mobility impairments.

SUMMARY

A general aspect of the current invention includes a method for modifying a display. The method includes receiving, by a host server, a request for an accessibility component from a web page server. The method includes receiving, by the host server, a web page component, from the web page server and then transmitting, by the host server, the accessibility component to the web page server. The accessibility component is configured to modify a web page content based on user input received at the host server. The accessibility component may be a plurality of modules that each provide different functionality. The method may further include transmitting, by a usage tracker, details regarding a first frequency use data of each of the plurality of modules. The method may further include transmitting, by the host server, a content management component that is configured to display the details regarding the first frequency use data of each of the plurality of modules. The method may further include optimizing the functionality of the plurality of modules based on the details regarding the first frequency use data of each of the plurality of modules. Optimizing may further include analyzing the frequency use data to identify a module that was least activated out of the plurality of modules. Optimizing then includes moving that module from a primary screen display to a secondary screen display that is selectable by the user. The optimizing further includes analyzing another frequency use data that is gathered subsequent in time relative to the first frequency use data. It then includes analyzing the next frequency use data that includes identifying a second module that was least activated out of the plurality of modules that were displayed on the primary screen display and moving the second module from the primary screen display to a secondary screen display that is selectable by the user. The method may also include transmitting, by a usage tracker, details regarding a frequency of use of each of the plurality of modules. The method could include updating, by the host server, the accessibility component and transmitting the updated accessibility component to the web page server based on details regarding the frequency of use of each of the plurality of modules. The method may also include receiving from a usage tracker a first frequency use data for each of the plurality of modules. The method further includes optimizing the functionality of the accessibility component by analyzing the first frequency data to identify a first module that was least activated out of the plurality of modules and moving the first module from a primary screen display to a secondary screen display that is selectable by the user. The optimizing further includes analyzing a second frequency data that is gathered subsequent in time relative to the first frequency data. The optimizing then includes analyzing the second frequency data and identifying a second module that was least activated out of the plurality of modules that were displayed on the primary screen display.

Another general aspect is an electronic device that includes a host server that is configured to receive a request for an accessibility component from a web page server. The host server is configured to receive a web page component from the web page server. The host server is also configured to transmit the accessibility component to the web page server. The accessibility component is configured to modify a web page content based on user input received at the host server. The accessibility component of the electronic device may also include a plurality of modules that each provide different functionality. The host server may also be configured to transmit a content manager component that is configured to display the details regarding the first frequency use data of each of the plurality of modules. The host server may be configured to optimize the functionality of the plurality of modules based on the details regarding the frequency use data of each of the plurality of modules. The host server may be configured to analyze the first frequency use data to identify a first module that was least activated out of the plurality of modules and move the identified first module from a primary screen display to a secondary screen display that is selectable by the user. The electronic device could further include a secondary use data that is gathered subsequent in time relative to the first frequency use data. The host server may be configured to analyze a second frequency use data to identify a second module that was least activated out of the plurality of modules that were displayed on the primary screen display and move the identified second module from the primary screen display to a secondary screen display that is selectable by the user. The electronic device may further include a usage tracker configured to transmit details regarding a frequency of use of each of the plurality of modules. The host server may be configured to update the accessibility component and transmit the updated accessibility component to the web page server based on details regarding the frequency of use of each of the plurality of modules. In another implementation, the electronic device may include a usage tracker that is configured to receive a first frequency use data for each of the plurality of modules. The host server may be configured to optimize the functionality of the accessibility component by analyzing the first frequency data to identify a first module that was least activated out of the plurality of modules. The host server could be configured to move the first module from a primary screen display to a secondary screen display that is selectable by the user. The host server could be configured to analyze the second frequency data that is gathered subsequent in time relative to the first frequency data to identify a second module that was least activated out of the plurality of modules that were displayed on the primary screen display.

Another general aspect is an electronic device that includes a means for generating an accessibility component for a web page server and an accessibility component that includes a plurality of modules that each provide different functionality. The accessibility component of the electronic device may further include a content manager component that is configured to display the details regarding the first frequency use data of each of the plurality of modules. The content manager component of the electronic device may be configured to optimize the functionality of the plurality of modules based on the details regarding the first frequency use data of each of the plurality of modules. The content manager component of the electronic device may be configured to analyze the first frequency use data to identify a first module that was least activated out of the plurality of modules. The content manager component could move the first module from a primary screen display to a secondary screen display that is selectable by the user. Secondary use data may be gathered subsequent in time relative to the first frequency use data and the content manager component may be configured to analyze a second frequency use data to identify a second module that was least activated out of the plurality of modules that were displayed on the primary screen display. The content manager component could be configured to move the identified second module from the primary screen display to a secondary screen display that is selectable by the user. Another implementation of the electronic device is where the accessibility component includes a usage tracker configured to transmit details regarding a frequency of use of each of the plurality of modules and a means to update the accessibility component based on details regarding the frequency of use of each of the plurality of modules. In another implementation of the electronic device, the accessibility component includes a usage tracker that is configured to receive a first frequency use data for each of the plurality of modules. The accessibility component may further include a content manager component configured to optimize the functionality of the accessibility component by analyzing the first frequency data to identify a first module that was least activated out of the plurality of modules. The content manager component may be configured to move the first module from a primary screen display to a secondary screen display that is selectable by the user. The content manager component may be configured to analyze the second frequency data that is gathered subsequent in time relative to the first frequency data to identify a second module that was least activated out of the plurality of modules that were displayed on the primary screen display.

BRIEF DESCRIPTION OF THE FIGURES

FIG. 5 is a screen shot showing the accessibility icon on a web page.

FIG. 6 is a screen shot showing the accessibility modules on a web page.

FIG. 8 is a screen shot of the highlight titles accessibility module implemented on a web page.

FIG. 10 is a screen shot of the keyboard navigation accessibility module implemented on a web page.

FIG. 11 is a screen shot of the white cursor accessibility module implemented on a web page.

FIG. 19B is a screen shot illustrating an increase line height button, which implements an adjust line height accessibility module.

FIG. 20A is a screen shot illustrating a decrease word spacing button, which implements an adjust word spacing accessibility module.

FIG. 20B is a screen shot illustrating an increase word spacing button, which implements an adjust word spacing accessibility module.

FIG. 21B is a screen shot illustrating an increase letter spacing accessibility module implemented on a web page.

FIG. 22A is a screen shot that illustrates an implementation of the change alignment accessibility module.

FIG. 22B is a screen shot that illustrates an implementation of the change alignment accessibility module.

DETAILED DESCRIPTION

Figure 1:
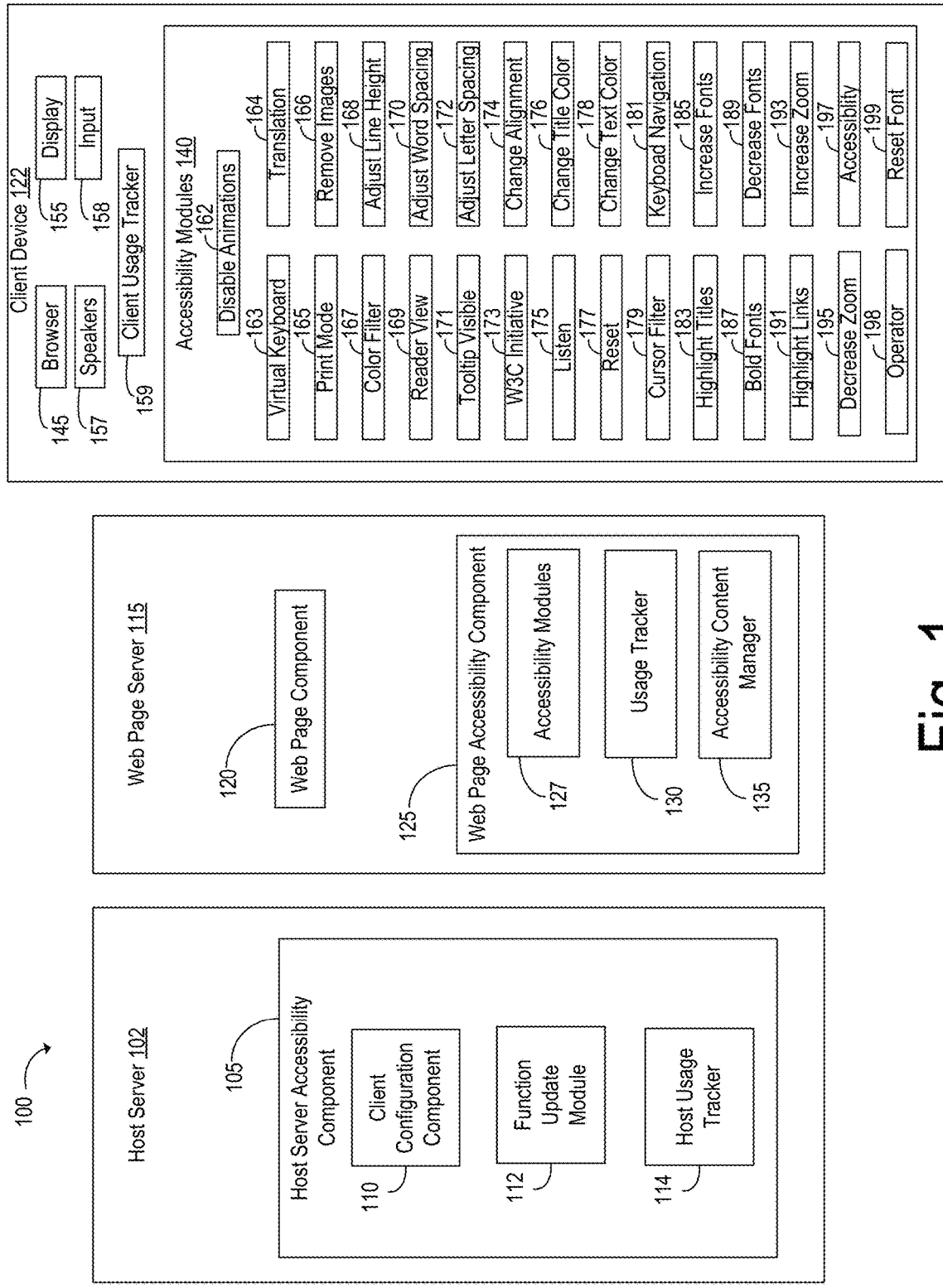
FIG. 1 is a block diagram of a computer implemented accessibility widget in accordance with a described implementation.

The computer implemented accessibility system and method has been developed and is described herein. It provides many new features including an accessibility component that acts to modify the display of a website to help the website achieve international accessibility standards. In various embodiments, the computer implemented accessibility system may act to modify the display of a mobile device, an operating system, or a kiosk. The computer implemented accessibility system may act to modify the display of a program application in addition to a web page. Another new feature is accessibility modules for a website that are configurable by a back-end web page server content management system. One of the configurable aspects is the ability to toggle accessibility modules on and off instantly. Another new feature is the ability to track usage of accessibility modules and user details to help improve accessibility modules and confirm that they are used. Another new feature is a monochrome color filter that modifies the display of a web page and allows for a selection of a singular color. Another new feature is a virtual keyboard that is selectable and is displayed on a web page. Another new feature is language translation in which a user can select a language for the computer implemented accessibility system to translate the contents of the web page. Another new feature is the ability to print modifications into another format such as a paper copy. Another new feature is the ability to remove images and disable animations. Another new feature is a control for the line height, word spacing, and letter spacing of text. Another new feature is the control to modify the alignment of text on a web page. Another new feature is a color picker to modify the color of titles or body text. Another new feature is a graphic representation of accessibility module settings. Another new feature is a logic component to prevent unusable combinations of modules by sequential layering. Another new feature is full keyboard navigation of the accessibility modules themselves. Another new feature is configurability of selectable accessibility icons. Another new feature is a built-in screen reader embedded in code on the client side that can read website content aloud. Another new feature is a server user interface on a web page for configuring the accessibility modules and features. Another new feature is the ability to track the accessibility module's usage by individual users and the ability to kill the accessibility modules. Another new feature is the ability to use tracked usage to optimize the web browsing experience across multiple websites and browser sessions. Another new feature is the ability to update the accessibility modules and features of websites from an independent server. Another new feature is the ability to track and retain individual usage statistics with the goal of using the information to defend against litigation that alleges noncompliance with accessibility standards. Another new feature is the ability to save the preferred settings of accessibility modules so that the settings may be easily transferred or applied to other devices.

The configuration of the accessibility modules will generally be controlled by a host server or web page server while the function of accessibility modules will be conducted by a client device. The functions of most accessibility modules are intended to be completed by client-side instructions such as Javascript. However, it is possible that some embodiments of accessibility modules may incorporate server processing.

Referring to FIG. 1, a computer implemented accessibility system 100 for making a website more accessible to individuals with impairments. The computer implemented accessibility system 100 may include, among other systems, a host server 102, a web page server 115, and a client device 122. The host server 102, web page server 115, and client device 122 may communicate over any network, including but not limited to, the internet or a local area network. The host server 102, web page server 115, and client device 122 may each be a computer system capable of storing, receiving, and transmitting data over a network. The computer implemented accessibility system 100 may be a distributed computer system. In some embodiments, host server 102 and web page server 115 may be co-located or may be both on a cloud-based computer system. The computer implemented accessibility system 100 is configured to create a widget that is displayed on a client device 122 on web pages that include the accessibility components.

The host server 102 is a server computer that is capable of communicating over a network with one or more computers to control or transfer the functionality of an accessibility component with the one or more computers. The host server 102 includes a processor, memory, hard drive input device output device and the like. The host server 102 includes a host server accessibility component 105, which includes a client configuration component 110, a function update module 112 and a host usage tracker 114. The client configuration component 110 is an instruction set capable of generating a web page accessibility component 125 that incorporates accessibility functions into a web page. The host server 102 may be used by an individual or entity to distribute web page accessibility components to web page servers 115 across any network. The host server 102 may also be used to update a web page accessibility component 125 and web page server 115 that may be stored on a web page server 115.

The host usage tracker 114 is configured to tabulate and record data collected by accessibility modules 140. In one embodiment, the client usage tracker 159 transmits data relating to the accessibility modules 140 to the host usage tracker 114. In another embodiment, web page servers 115 transmit data collected by the web page accessibility component 125. Data from the host usage tracker 114 may be used to improve the accessibility component generated by the client configuration component 110. Improved accessibility components may also be pushed to update web page accessibility components 125 from the function update module 112. The improvements can be done manually or through an automated process.

The host server 102 may be a central hub to deliver web page accessibility components 125 to web page servers 115. The web page server 115 delivers client accessibility modules 140 to client devices 122. The host server 102 may be used to distribute a web page accessibility component 125 to any number of web page servers 115, thus saving the time, expense, and liability of web page developers. In one embodiment, the host server 102 is set up as a service over the Internet, whereby web page hosts may request to have a web page accessibility component 125 transmitted to their pages. In another embodiment, the host server is set up on the internal network of an entity that is bound by regulations that require accessibility for users or employees with impairments.

In some embodiments, the host server 102 receives a request from a web page server 115 for a web page accessibility component 125. The client configuration component 110 generates a web page accessibility component 125 that is transmitted back to the web page server 115.

The client configuration component 110 generates the web page accessibility component 125, which may include accessibility modules and be incorporated into the objects and operations of the original web page component 120. In one embodiment, the client configuration component copies a piece of HyperText Markup Language ("HTML") code. In another embodiment, the client configuration component 110 reads the web page component 120 of a web page server 115 before generating a custom HTML code for that web page component 120.

The function update module 112 updates the HTML code that the client configuration component 110 generates. A possible motivation for the update might be to improve the accessibility modules 140. Another possible motivation could be to keep up with evolving accessibility standards.

In one embodiment, the function update module 112 can push updates remotely from an independent host server 102. The independent host server 102 does not wait for a request from a web page server 115 to update the web page accessibility component 125. Instead, when the independent host server 102 updates its client configuration component 110, it generates a web page accessibility component 125, and pushes the updated web page accessibility component 125 to the web page server 115 automatically.

In another embodiment, the host server 102 independently assesses one or more web page servers 115 to determine whether the web page server 115 requires an accessibility component before transferring a web page accessibility component 125 to the web page server 115. The assessment criteria, for determining whether a web page server 115 requires accessibility modules 127, may be any measure that one would reasonably conclude that the web page needs accessibility modules 140. In other implementations, the host server 102 connects to a web page server 115 and transfers the web page component 120 to the web page server 115 if the web page server 115 has a minimum amount of text. In another implementation of this embodiment, a host server 102 transfers a web page component 120 to all web page servers 115 that are subject to increased government regulation, such as any web page servers 115 on an internal business network that are accessed by employees.

In another embodiment, the client configuration component 110 creates custom accessibility modules based on the content of the web page server 115. In one embodiment, the host server 102 connects to a web page server 115 and generates a color filter 167 accessibility module based on the original color of the text and background in the web page. The custom color filter algorithm would be optimized to create a color filter 167 that closely matches the original text and background color of the web site while also creating high contrast between the background and text.

The web page server 115 is a server computer that is capable of communicating over a network with one or more computers to control or transfer the functionality of an accessibility component with the one or more computers. The web page server 115 includes a processor, memory, hard drive input device output device and the like. It includes the web page component 120 and the web page accessibility component, which includes accessibility modules 127, a usage tracker 130, and an accessibility content manager 135.

The web page component 120 may be coded with programming languages such as, but not limited to, HTML, Javascript, cascading style sheets ("CSS"), or any other language or code or combination thereof that defines the objects and operations of a web page. The web page component 120 defines the way web pages in a website look to an individual user and how that user interacts with them. The background, placement of buttons, links to other web pages, text, font, cursor, images, and more can all be precisely placed and defined by the web page component 120. The web page component 120 can also define different variations of web pages based on the browser 145, device, geographic location, or any variable that distinguishes an individual user from another.

In one embodiment, a web page server 115 has a Uniform Resource Layer ("URL") address. A user will specify the URL to a browser 145, whereby the user will connect to the web page server 115 and receive the web page component 120. The browser 145 will then interpret the web page component 120 to display a web page to the user.

The web page accessibility component 125 is a set of instructions (e.g., widget) that are added to the web page component 120. It has the function of adding an accessibility layer to the web page component 120. In some embodiments, the web page component 120 executes all of its original instructions before the web page accessibility component 125 executes additional instructions. The web page accessibility component 125 includes an accessibility module 127, a usage tracker 130 and an accessibility content manager 135. It also has a kill switch that can close all the processes or functionality associated with the web page accessibility component 125.

In one embodiment, the web page accessibility component 125 is a piece of HTML code that is embedded before the end of the body tags of the web page component 120. The body tag defines the main content of a web page that will be visible to the individual user. Thus, by placing the web page accessibility component 125 before the end of the body tag, the web page accessibility component 125 acts as a final layer of instruction that modifies the original content of the web page.

The accessibility modules 127 are code within the web page accessibility component 125 that defines how a web page is modified to make it more operable, distinguishable, navigable, and understandable to the user. For example, the increase font 185 accessibility module acts to increase the font of text in a web page to make it more distinguishable regardless of what the original text size of the web page is.

The usage tracker 130 is software on the web page accessibility component 125 that is capable of recording interaction of a client with a web page. The usage tracker 130 tabulates each time an accessibility module is used. It tracks the module used along with the time and URL address of the client user. The usage tracker 130 may be used to show which accessibility modules 140 get the most use. It may also be used to defend a web page owner from a litigation claim that the web page did not conform to regulatory standards when an individual used it. In one embodiment, the client usage tracker 159 on the client device 122 logs data of accessibility module 140 use and transfers, to the web page server 115, the data for every time the accessibility module 140 is used. The data of each individual execution of an accessibility module 140 is linked with the time, date, and URL address of the client user.

The accessibility content manager 135 is a user interface that controls content of the accessibility module from the web page server 115. Content and functions of the accessibility modules 127 may be manipulated by the accessibility content manager 135. These include placement of the accessibility icon, selecting the icon image, and selecting which accessibility modules 140 to incorporate into the web page.

In one embodiment, variables in the accessibility content manager 135 are optimized to maximize use by analyzing the usage tracker 130. In one implementation of this embodiment, placement of the icon position 410 and icon placement 415 variables are incrementally adjusted until the icon is in the ideal location where it is clicked by the highest percentage of client users. The icon position 410 and icon placement 415 variables may be adjusted manually or through an automated algorithm. In another implementation of this embodiment, settings of color filters 167 are incrementally adjusted based on the number of times color filter 167 accessibility modules are used. In another implementation of this embodiment, individual accessibility modules 140 are toggled on and off to maximize use of the other accessibility modules 140.

The client device 122 is any computer system with a processor and memory that sends and receives data over a network. It includes a browser 145, a visual display 155, speakers 157, a means of input 158, a client usage tracker 159, and accessibility modules 140. The client device 122 may be used by any individual including those who may have a visual, audio, or mobility impairment. Accessibility modules 140 are executed on the client device.

The browser 145 is software on the client device 122 that directs the client device to connect to the URL of a web page server, receives the instructions that define a web page, and interprets those instructions to create the web page on the display 155 and speakers 157 of the client device. The browser 145 may connect to a URL automatically or a user may manually enter it.

The display 155 is any screen, projection, or other means of rendering patterns, images, and text commonly seen on web pages. Common displays are phone screens, tablet screens, and computer monitor screens. The browser 145 interprets web page component 120 instructions to render an image of that web page. A website can be designed to render differently based on the type of display 155 the client is using.

The speakers 157 play audio on the client device. The listen 175 accessibility module, for example, uses speakers to read the text from a web page. Input 158 on a client device is any interaction with a website that a user brings into effect. Input 158 devices such as keyboards, mice, touch screens, game controllers, motion sensors, and microphones are all used to interact with websites.

The client usage tracker 159 is a module that tabulates and records usage of the accessibility modules. In one embodiment, the usage tracker records every time an accessibility module is selected, also recording the time and the URL address of the client device 122. In another embodiment, the client usage tracker 159 also records client device 122 configuration data such as IP address, browser 145 type and settings, operating system accessibility settings such as the read aloud voice, and any other identifying or profiling data. In another embodiment, preferred accessibility settings that were recorded by the client usage tracker 159 may be saved in an easy to transfer file format such as JSON or CSV. The saved file may be exported to a web page server 115 or imported into other client devices 122. The client usage tracker 159 is also configured to transmit all data that it collects to a server. In one embodiment, the client usage tracker transmits data to the usage tracker 130 on the web page server 115. Data collected by the web page server 115 may be analyzed to find the optimum accessibility settings for accessibility modules 140, web page components 120, browsers 145, operating systems, and client devices 122. In another embodiment, the client usage tracker 159 transmits data to a server that is not the web page server 115. In one embodiment, data is transmitted to the host usage tracker 114. The client usage tracker 159 may be used to improve the experience of the client user by remembering the accessibility modules 140 that a client selects and automatically selecting those same modules for that client's future use.

The client accessibility modules 140 are a set of instructions transmitted from the web page accessibility component 125. The accessibility modules 140, when executed, modify a website's visual and audio output to be more operable, distinguishable, navigable, and understandable. The client accessibility modules 140 also help a website conform to W3C Content Accessibility Guidelines ("WCAG"), which is an international standard for web content accessibility. WCAG 2.0 has four principles that the information and interface on a website should be. The four principles are perceivable, operable, understandable and robust.

The client accessibility component 140 includes, but is not limited to the following types of accessibility modules: disable animations 162, virtual keyboard 163, translation 164, print mode 165, remove images 166, color filter 167, adjust line height 168, reader view 169, adjust word spacing 170, tooltip visible 171, adjust letter spacing 172, W3C Initiative 173, change alignment, listen 175, change title color 176, reset 177, change text color 178, cursor filter 179, keyboard navigation 181, highlight titles 183, increase fonts 185, bold fonts 187, decrease fonts 189, highlight links 191, increase zoom 193, decrease zoom 195, accessibility 197, operator 198, and reset font 199.

The disable animations 162 accessibility module may control the animations of a web page to help reduce distractions to a user. Fast moving graphics, however aesthetically pleasing, may trigger undesirable stimuli for the viewer. The disable animations 162 accessibility module may be implemented as a toggle that, when selected by a user, deactivates or activates all animations on a web page. A toggle that deactivates the animations allows the user to focus on the text content of a web page. A user may turn animations back on using the same toggle to view the animations.

The virtual keyboard 163 accessibility module displays a selectable virtual keyboard on a web page. The virtual keyboard 163 may enable typing functionality for users that do not have a keyboard available or do not have a keyboard that is accessible due to a disability. When selected, the keys of the virtual keyboard function the same as the keys of a physical keyboard. When a physical keyboard is used, the virtual keyboard 163 may highlight the analogous keys of the virtual keyboard that were pressed. The keys of the virtual keyboard may be selected by various inputs such as mouse click or touch.

The translation 164 accessibility module allows a user to select a language that the user prefers. The language translation may enable users that do not understand a default language of displayed text on a web page to change the text to a translated version of the text. In various embodiments, the translation 164 accessibility module, when activated, displays a list of languages that are selectable by the user. The web page may display text in the language that is selected by the user. In an exemplary embodiment, the text of a web page is translated into multiple languages and stored in the web page. The preferred language translation may be displayed by the translation 164 accessibility module.

The print mode 165 accessibility module allows a user to print the reader view of a web page. Printing a web page gives users greater flexibility to display the web page in a format that the user prefers. For example, a user may print a web page onto paper, which may be the preferable reading format for users. In an exemplary embodiment, all accessibility modules, which have been activated by the user, are also printed. For example, a reader may use print mode 165 to print a web page with increased letter spacing by first activating the adjust letter spacing 172 accessibility module and then activating the print mode 165 accessibility module.

The remove images 166 accessibility module modifies the output of a web page to display a blank space in place of images. In an exemplary embodiment, remove images 166 presents an experience on a web page that is devoid of any graphical image files, allowing the viewer to focus on the text of the web page.

The color filter 167 changes the color scheme of a web page. The color filter 167 can render a web page to be more perceivable to users with visual impairments, thus conforming to principle 1, "perceivable" of the WCAG 2.0 guidelines. Different types of color filters may work better than others for certain types of visual impairments. For instance, a user with color blindness may perceive a web page more clearly with one type of color filter 167 than a user with blurred vision.

As shown on the buttons in FIG. 6, the preferred embodiment has the following types of color filters 167: monochrome, sepia, high contrast, black and yellow (WCAG Contrast), gray scale, and invert. The monochrome color filter modifies the web page to render a monochromatic color scheme, which will display the graphics on a page in one color hue. The sepia color filter executes a reddish-brown color scheme, which may help users with colorblindness better perceive a web page. The high contrast color filter toggles a high contrast color scheme to make a web page more distinguishable. The black & yellow (WCAG Contrast) color filter executes techniques to satisfy various guidelines under the WCAG 2.0—(1) Perceivable principle; specifically, guidelines: 1.4.1 Use of Color, 1.4.3 Contrast (Minimum), and 1.4.6 Contrast (Enhanced). This filter may help individuals with visual impairment and/or color-blindness. The gray scale color filter toggles the web page to a grayscale color scheme to make the page more distinguishable. The invert color filter inverts colors on the web page, making it easier for people with sensitivity to brightness and more distinguishable for people with color-blindness or low vision.

The adjust line height 168 accessibility module adjusts the spacing between lines of text for content on a web page. Readability may be enhanced for users who can adjust line spacing. In an exemplary embodiment, the adjust line height 168 accessibility module may be activated by the user clicking on buttons that increase line height and decrease line height. In an exemplary embodiment, the adjust line height 168 accessibility module may be split into two buttons. One button, when activated, increases the line height. The other button, when activated, decreases the line height.

The reader view 169 accessibility module parses the web page content to make it more readable in a format that displays images with captions and the pertinent body text in one easy to read view.

The adjust word spacing 170 accessibility module adjusts the spacing between words of content on a web page. In an exemplary embodiment, the adjust word spacing 170 accessibility module may be activated by the user clicking buttons that increase and decrease the spacing between words. Also, in an exemplary embodiment the spacing between words may be adjusted by toggling a slider that represents the relative spacing between words.

The tooltip visible 171 accessibility module displays all the tool tips or messages that appear when a cursor is positioned over an icon, image, hyperlink or other element on a website. It helps satisfy several guidelines under the WCAG 2.0—(1) Perceivable, (2) Operable, (3) Understandable, and (4) Robust principles and their underlying criteria. The tooltip visible 171 accessibility module may be combined with other functions using the operator 198 module such that accessibility modules 140 operate only on tooltips.

The adjust letter spacing 172 accessibility module adjusts the spacing between letters of text on a web page. Users may increase readability by adjusting the spacing between letters to a spacing with which they are most comfortable. In an exemplary embodiment, the adjust letter spacing 172 accessibility module may be implemented as an increase letter spacing button and a decrease letter spacing button that can be activated by a user.

The W3C Initiative 173 accessibility module executes an instruction to take a user to the World Wide Web Consortium's (W3C) Website content Accessibility Guidelines and review the success criteria for WCAG 2.0.

The change alignment 174 accessibility module allows a user to set all of the content on a web page to an alignment of their preference. Users may be more comfortable reading with a specific alignment. Allowing the user to set the alignment themselves may thus improve readability. In an exemplary embodiment, a user may set the alignment of content via buttons that represent different alignments. For example, a user may have a selection of four buttons representing the four alignment options: align center, align left, align right, and align justify.

The listen 175 accessibility module executes an instruction to read the web page aloud via the speaker of the device so that visually impaired individuals can decipher the content on the web page. Executing the listen module 175 again stops the instruction to read aloud. One implementation of the listen 175 accessibility module is the point and click audio translation of text on a page. In this implementation, text boxes are translated into audio speech and read aloud when they are selected. Individual text boxes may be identified by their HTML element labels. The full-page implementation automatically translates all the text on a page to be read aloud. Alternatively, it reads the individual text box that a cursor hovers over. The tab-through keyboard control gives the client user the ability to use the tab button to cycle through individual text boxes on the web page to have them read aloud. The escape button may be used to turn the listen accessibility module off and on.

The change title color 176 accessibility module allows a user to change the color of titles on a web page. Control over the color of titles on a web page may enhance the readability of the web page for users with sight disabilities. In an exemplary embodiment, selecting a title color button may display a color picker featuring 36 different selectable colors that allows a user to change the color of all title tags on a web page. The ability to choose a specific color allows users to quickly select a color with which they are most comfortable.

The reset 177 accessibility module reverts a web page back to its original state before any accessibility modules 140 were executed. In one embodiment where more than one accessibility module is active, the reset 177 module merely resets the changes made by the accessibility module that was executed last. In another embodiment where accessibility modules 140 operate on other accessibility modules 140 through the operator 198 module, the reset 177 module may be configured to reset only the accessibility modules 140 that are operating on other accessibility modules 140.

The change text color 178 accessibility module allows the user to change the color of all body text on a web page. Control over the color of text on a web page may enhance the readability of the web page for users with sight disabilities. In an exemplary embodiment, a change color button displays a color picker featuring 36 different selectable colors that, when selected, change the color of all body text on web page to the selected color.

The cursor filter 179 accessibility module turns on a high contrast, magnified mouse, colored white or black that enables users with visual impairments to more easily identify the mouse cursor on a screen. The cursor filter 179 accessibility module satisfies WCAG guidelines 1.4 Distinguishable, 2.4 Navigable, and other interoperability requirements. The cursor filter 179 may be used in combination with the keyboard navigation 181 accessibility module to help users find a cursor that is lost on a screen.

The keyboard navigation 181 accessibility module displays the key combinations that execute accessibility modules via keystroke input rather than by selecting a button with a cursor. This module satisfies WCAG 2.0 Principle 2; specifically, guideline 2.1, which calls for all functionality of a website to be available from a keyboard. The highlight titles 183 accessibility module toggles a highlight color for all text tagged as a title on a web page. This module makes a web page more navigable and distinguishable. The increase fonts 185 accessibility module, when executed, increases the font size on a web page to up to 200% its original size without loss of content or functionality. Likewise, the decrease fonts 189 accessibility module, when executed, reduces the font size down to half its original size without loss of content or functionality. The increase fonts and decrease fonts accessibility modules satisfy WCAG 2.0 Principle (1) Perceivable; specifically, guideline 1.4.4 resize text and additional rules.

The bold fonts 187 accessibility module executes an instruction to boldface all fonts on the web page. This accessibility module meets WCAG 2.0 guideline 1.4.6 Contrast (Enhanced). The Highlight Links 191 accessibility module toggles a highlight color for all links on a web page. This accessibility module satisfies WCAG 2.0 guidelines: 2.4.3 Focus Order, 2.4.4 Link Purpose, 2.4.9 Link Purpose, and 3.1 Readable. It makes the website more navigable and distinguishable. The increase zoom 193 accessibility module magnifies a web page for easier readability. Likewise, the decrease zoom 195 accessibility module reduces magnification of the web page.

The accessibility 197 accessibility module executes an instruction to direct the browser to the URL of a dedicated accessibility web page of the website. The web page URL can be set in the accessibility content manager 135. The accessibility 197 module satisfies WCAG guideline 3.3.5 for context-sensitive help.

Figure 7:
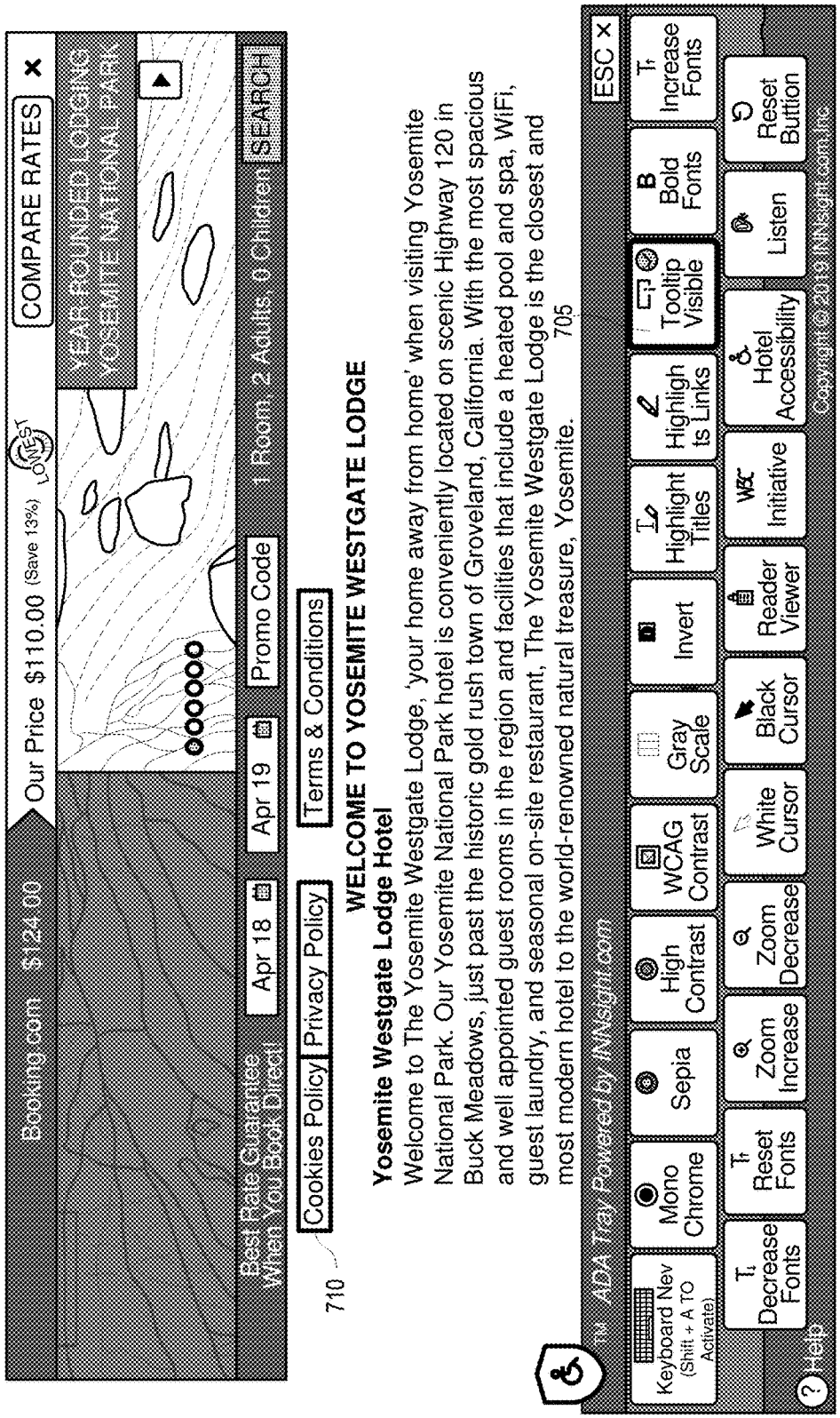
FIG. 7 is a screen shot of the tooltip visible accessibility module implemented on a web page.

The operator 198 accessibility module modifies the execution instructions for an accessibility module to operate on the execution of another accessibility module 140 rather than on the entire web page. In one example of the operator 198 module's execution, the bold fonts 187 accessibility module may be modified to operate on the highlight titles 183 accessibility module to toggle boldface fonts only on web page text that is tagged as a title. In another example of use, the listen 175 accessibility module may be modified to operate on the tooltip visible 171 accessibility module, whereby only the tooltips, also shown in FIG. 7, are read aloud.

The reset font 199 accessibility module returns the font back to the original size and style. In one embodiment the reset font 199 accessibility module returns the fonts of the entire web page back to the original font. In other embodiments, where one accessibility module is operating on another module to modify its font, the reset font 199 module may be used to only return the font of the module that was operated upon.

Display filters are sequentially layered with logic to prevent multiple display filters from rendering an unusable end result. For example, only one color filter 167 accessibility module may be active at one time because multiple color filters 167 may interfere with one another to render a display that is less accessible or unusable. When any color filter 167 is executed, other active color filters are toggled off. Similarly, cursor filters 179 also toggle off any other cursor filters that are on when they are executed. The sequential layering logic allows filters that do not interfere with one another to continue executing while filters that do interfere are turned off. Sequential logic layers may be independently applied to modifications made by the operator 198 accessibility module. For example, the sequential logic layer may prevent the operator 198 module from modifying another accessibility module with more than one color filter 167.

Figure 2:
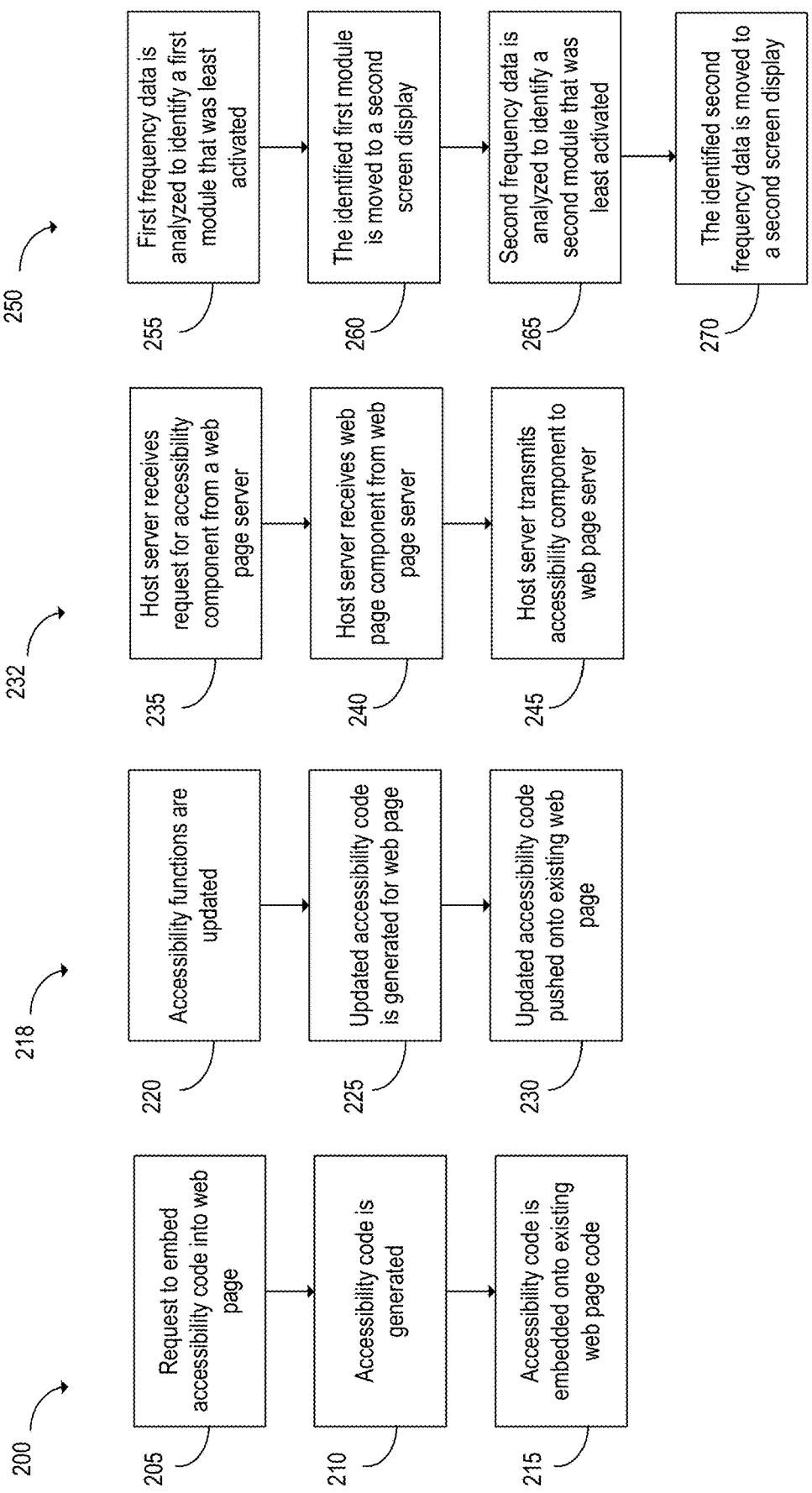
FIG. 2A is a flow diagram of a process for adding an accessibility widget to a web page, in accordance with a described implementation.
FIG. 2B is a flow diagram of a process for updating an accessibility widget to a web page, in accordance with a described implementation.
FIG. 2Cc is a flow diagram of a process for updating an accessibility widget to a web page, in accordance with a described implementation.
FIG. 2D is a flow diagram of a process for optimizing an accessibility widget to a web page, in accordance with a described implementation.

FIG. 2A illustrates a method 200 that may be implemented by the system in FIG. 1. In various embodiments, the computer implemented accessibility system 100 may allow a website owner to add additional functionality to their web pages. Additional functionality may include making the web page more accessible to individuals with visual, audio, or mobile impairments by including a web page accessibility component 125 on the web page server 115.

At step 205, a host server 102 may receive a request to include accessibility code into a web page hosted by web page server 115. In response to the request from step 205, the host server 102 may generate the accessibility code. The request can be through any form of communication. In the preferred embodiment, the request is transmitted over the internet.

At step 210, the accessibility code is generated. The accessibility code can be a piece of HTML code. In one embodiment, the HTML code is copied and transmitted to a web page server. In another embodiment, a unique HTML code is generated based on the needs of the website for which the request was made. Although HTML code is used in the envisioned embodiment, there are possible embodiments that do not use HTML code. The generated HTML code has the instructions for accessibility modules 140 that make web sites more accessible to individuals with impairments. In one embodiment, the HTML code includes a content management system, also shown in FIGS. 3-4. At step 215, the accessibility code is embedded onto existing web page code. In one embodiment, the accessibility code is embedded before the body tags of the HTML code that define the website.

FIG. 2B illustrates a method 218 that may be implemented by the system in FIG. 1 for updating the accessibility code on a web page server. It may be periodically necessary to update the accessibility code for a variety of reasons including, a change in WCAG guidelines, a change in web standards such as HTML, and hardware changes. At step 220, accessibility code is updated. The update can be done manually by editing the code or through an automated system.

At step 225, the updated accessibility code is generated for the web page. The accessibility code can be a piece of HTML code. In one embodiment, the same code is copied for every website. In another embodiment, different code is generated based on the website' s instruction set. At step 230, the updated accessibility code is pushed onto the existing website's code. The update replaces the accessibility code on the website. In one embodiment, the update is performed automatically by an independent server. In another embodiment, the update is done manually by transmitting the updated code to a web page server 115 and inserting the code to replace the web page accessibility component 125.

Referring to FIG. 2C, a method 232 illustrates that at step 235, a host server 102 receives a request for an accessibility component from a web page server 115. The accessibility component is any code that contains the instructions for accessibility modules 140. The request can be through any form of communication including TCP-IP and email. The host server 102 may evaluate the request to accept or reject it. In some embodiments, the request includes a subscription and payment for an accessibility service.

At step 240, the host server 102 receives a web page component 120 from a web page server 115. It is intended that the host server 102 will generate a web page accessibility component 125 for the web page component 120. In some embodiments, the host server 102 may generate a custom component based on the needs of the web page server 115. At step 245, the host server 102 transmits an accessibility component to the web page server 115. The accessibility component is any code that contains the instructions for accessibility modules 140.

FIG. 2D is an illustration of a method 250 that may be implemented by the system in FIG. 1 to optimize the functionality of the accessibility component through iterative steps. At step 255, frequency data from the usage tracker 130 is analyzed to identify the accessibility module that was selected the least over a period of time. "Selected the least" means that a module was getting lower use than other modules and may be measured in any way including: measuring for the module that was clicked the least number of times, activated for the least amount of time, executed by the least number of unique individuals, any combination herein, or any other measure of the use for a module.

At step 260, the module that was identified as least selected is moved to a second screen display. The second screen display includes, but is not limited to, another web page or any location away from the first screen. At step 265, a second frequency data is collected and analyzed to identify a second module that is least selected. The second frequency data is collected while the first module that was selected the least has been removed to the second display screen. The second frequency data can also be evaluated to determine whether the accessibility component is better, worse, neutral, or insignificantly better than it was before the first module was removed.

At step 270, the second module that is least selected is moved to the second display screen. At this point, the first module that was least selected may be moved back. Alternatively, the process may be repeated to identify a third module that is least selected. This process may be repeated any number of times with the goal of finding the ideal combination of modules, placement of modules, or any other accessibility module setting.

In one embodiment, the web browsing experience is tuned or optimized based on data collected by accessibility modules 140. Accessibility module frequency data from client users may be collected by the client usage tracker 159 and used to modify the client's browser 145 settings to suit the client user's preferences. In another implementation, accessibility module frequency data from client users is collected by the usage tracker 130 of web page server 115 owners to tune or optimize the settings of a website or multiple websites. The tuning or optimization may be done through any method of data analysis including, but not limited to, machine learning algorithms.

Figure 3:
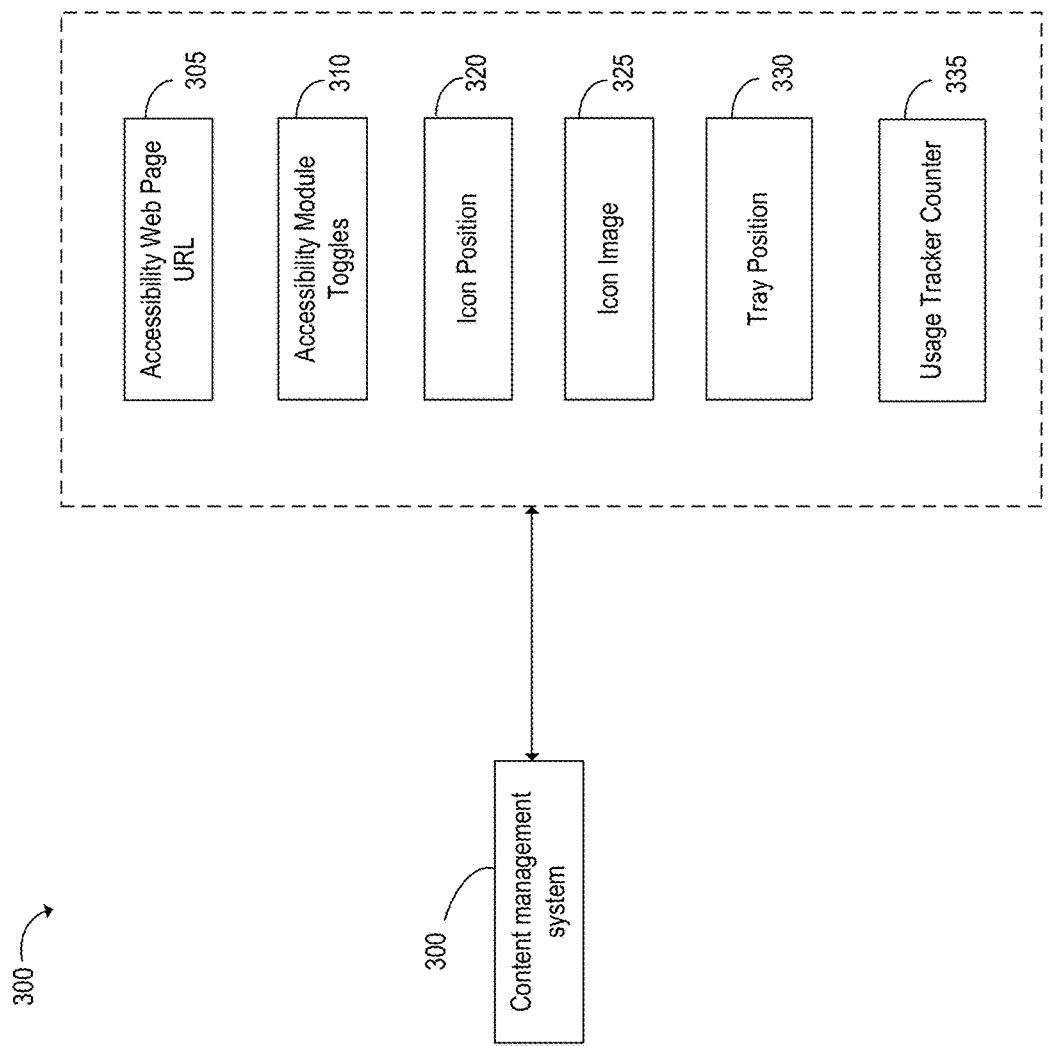
FIG. 3 is a block diagram of a content management system in accordance with a described implementation.
Figure 4:
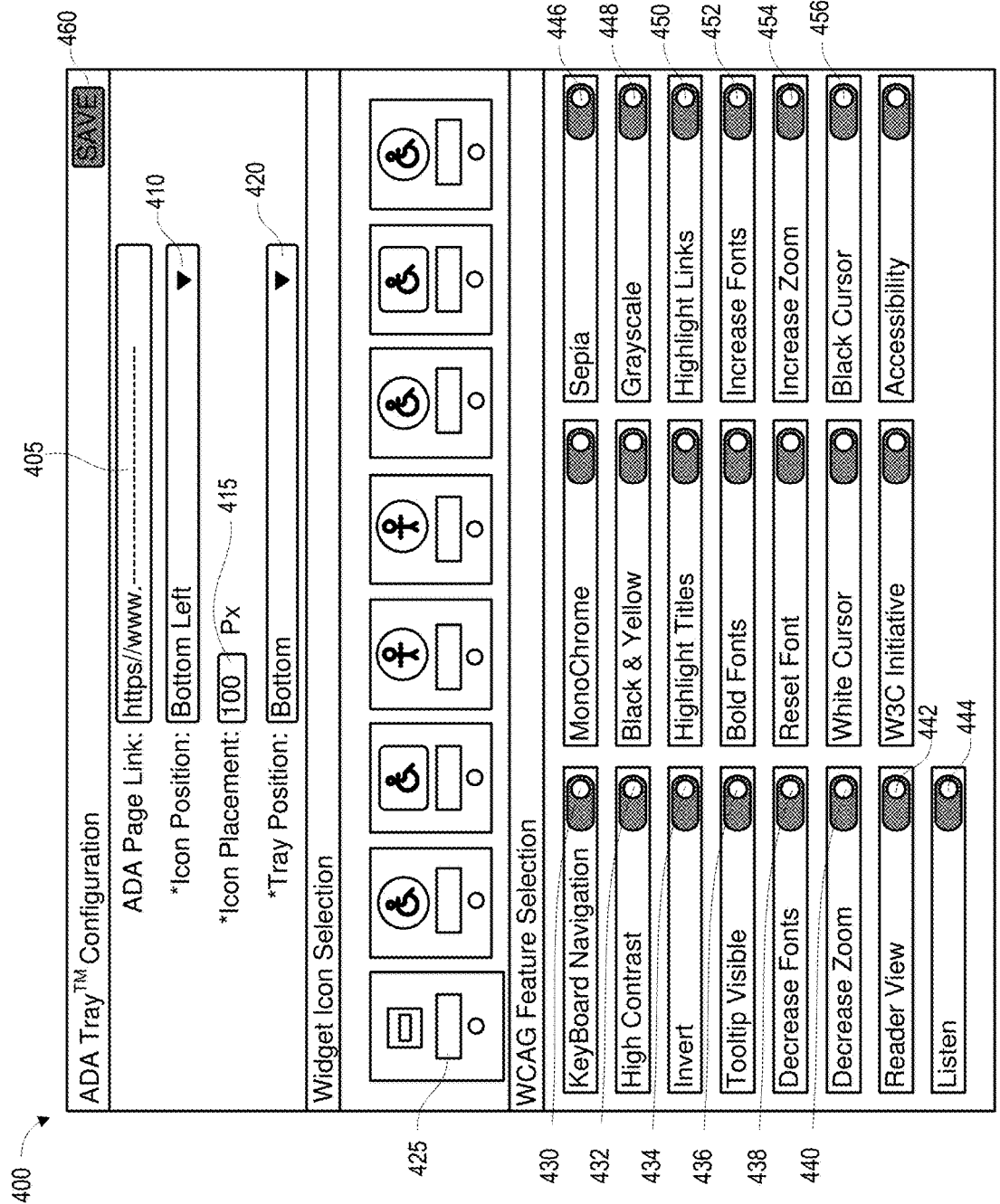
FIG. 4 is a screen shot of the content management system for the accessibility component on a web page.

Referring to FIGS. 3-4 the content management system functions to manipulate the web page accessibility component from the web page server. FIG. 3 shows a diagram of the content management system and the various features that can be managed. FIG. 4 shows a screen shot of the user interface of the content management system from FIG. 3. As shown in FIG. 3, the content management system can modify the accessibility web page URL 305 address, the accessibility module toggles 310, the icon Position 320, the icon image 325, and the tray position 330. Nothing in FIGS. 3-4 is intended to limit components and settings that the content management system 300 can modify.

The Accessibility Web page URL 305 is for the dedicated accessibility page on the web page server where a user is directed when they execute the accessibility 197 accessibility module. Accessibility modules toggle 310 lists every accessibility module and places an on/off toggle next to it. Thus, the content management system may control which accessibility modules are available to the user on the client device. As the number of accessibility modules 140 grows, it becomes more necessary to pick some over others to implement on a web page. The accessibility modules toggle 310 gives web page server's 115 the ability to select a subset of accessibility modules to make available on a web page.

The content management system has control over icon position 320. And because web pages have different content, the placement of the icon that opens functionality for the accessibility modules can be important. It is suggested that the icon be placed away from images and text that make it difficult for the visually impaired to perceive the icon. The content management system can place the icon, shown in FIG. 5, at any position on the web page. Similarly, the icon image 325 can also be manipulated by the content management system to make it easier for users of client devices to perceive it.

The content management system also has control over the tray position 330. The tray is a box that opens when the icon is selected. Within the box are buttons that represent the accessibility modules 140. Placement of the tray can be set in the content management system.

The content management system may have a usage tracker counter 335 that tabulates the usage of each accessibility module 140. In one embodiment, the usage tracker counter 335 displays the number of times an accessibility module is selected next to the accessibility module toggle 310. This embodiment gives the users of web page servers 115 the usage information to toggle off accessibility modules that have little or no use.

A screen shot of the content management system user interface shown in FIG. 4 shows the accessibility web page URL 405, icon position 410, icon placement 415, tray position 420, widget icon selection 425, and the user interface of the WCAG feature selections 430-456. In the embodiment shown in FIG. 4, icon position on the screen is controlled by both the icon position 410, and icon placement 415 variables.

The keyboard navigation button 430 toggles the ability for a client user to execute one of the modules in the accessibility modules 140 to display the individual key combinations that execute other accessibility modules via keystroke input rather than by clicking a button. The high contrast button 432 toggles the high contrast color filter 167 ability for a client user to execute a high contrast color scheme to make a web page more distinguishable. The invert button 434 toggles another color filter 167 ability for a client user to execute a filter to invert the colors on a page. The tooltip visible button 436 toggles the ability for a client user to execute a tooltip visible 171 module to display all tooltips that usually only appear when a cursor is over them. The decrease fonts button 438 toggles the ability for a client user to execute the decrease fonts module 189 on the web page. The decrease zoom 440 button toggles the ability for a client user to execute the decrease zoom 195 module to reduce the magnification and shrink the web page. The reader view button 442 toggles the ability for a client user to execute the reader view 169 module that parses the page content to make it more readable in a format that displays images with captions and the pertinent body text in one easy to read view. The listen button 444 toggles the ability for a client user to execute the listen module 175 that reads an audio translation of text on the page. The sepia button 446 toggles the ability for a client user to execute the color filter 167 to create a reddish-brown color overlay for the web page. The grayscale button 448 toggles the ability for a client user to execute the grayscale color filter 167 on the web page. The highlight links button 450 toggles the ability for a client user to execute the highlight links 191 filter that highlights the color for links on a web page. The increase fonts button 452 toggles the ability for a client user to execute the increase fonts 185 module for all text on a web page. The increase zoom button 454 toggles the ability for a client user to execute the increase zoom 193 module that magnifies the entire web page. The black cursor button 456 toggles the ability for a client user to execute the cursor filter 179 module that makes the cursor larger with a high contrast black color. The accessibility button toggles the ability for a client user to execute the accessibility 197 module that directs them to a dedicated accessibility web page on the website. The save button 460 executes a function to save the accessibility web page URL 405, icon position 410, icon placement 415, tray position 420, widget icon selection 425, and the WCAG feature selections 430-456 on the accessibility content manager page 400. The function executed by the save button 460 may create a file in plain text format such as JSON or CSV with saved accessibility that is easily shared.

Referring to FIG. 5, a screenshot of a web page 500 with the accessibility icon 505. In the preferred embodiment, the icon is an image that denotes accessibility. The icon is placed away from any images or text that may distract the user from perceiving it. When the icon is clicked, as shown in FIG. 6, it opens the tray of accessibility modules. Clicking the icon again, closes the tray.

Referring to FIG. 6, FIG. 6 illustrates a screen shot of a web page 600 with a tray that is a rectangular box where buttons that execute accessibility modules 140 are placed. The icon 606, when clicked, functions to close the tray. The Keyboard Nav button 606 executes the keyboard navigation 181 accessibility module to display the keyboard combinations, that when pressed, execute accessibility modules 140. The Mono Chrome button 608, Sepia button 610, High Contrast button 614, WCAG Contrast button 618, Gray Scale button 620, and Invert button 624 are all various color filter 167 accessibility modules that modify the color scheme of the web page. The white cursor 626 and Black Cursor 630 are variations of the cursor filter 179 accessibility module. The Hotel Accessibility button 642 executes the accessibility 197 module. The Reset Font button 612 executes the reset font 199 accessibility module. The Zoom Increase button 616 executes the increase zoom 193 accessibility module. The zoom decrease button 622 executes the decrease zoom 195 accessibility module. The Highlight Titles button 628 executes the highlight titles 183 accessibility module. The Reader Viewer button 634 executes the reader view 169 accessibility module. The Highlight Links button 632 executes the highlight links 191 accessibility module. The W3C Initiative button 638 executes the W3C initiative 173 accessibility module. The Tooltip Visible button 636 executes the tooltip visible 171 accessibility module to display tooltips that would normally require a cursor to hover over them. The Bold Fonts button 640 executes the bold fonts 187 accessibility module. The Listen button 643 executes the listen module 175 accessibility module to read text aloud. The Reset Button 644 executes the reset 177 accessibility module to revert the web page back to the original state. The Increase Fonts button 646 executes the increase fonts 185 accessibility module to increase the font size of all text. The Decrease Fonts button 648 executes the decrease fonts 189 accessibility module to lower the font size of all text.

Referring to FIG. 7, a screenshot 700 of the tooltip visible 171 accessibility module as it is executed. As the Tooltip Visible button 705 is selected, tooltips 710 display on the screen, which would normally require the placement of the cursor over them to display. This module has the advantage of allowing the viewer of a web page to quickly perceive and read all tooltips without having to guess at where they are. Selecting the Tooltip Visible button 705 again returns the page back to normal tooltip settings that require a hovering cursor to display.

Referring to FIG. 8, FIG. 8 a screenshot 800 of the highlight titles 183 accessibility module as it is executed. As the Highlight Titles button 805 is selected, all text tagged as a title 810 is highlighted with a different color background on the screen. In one embodiment, the Highlight Titles button 805 may be used in combination with the operator 198 accessibility module and the listen 175 accessibility module to instruct the page to read all titles aloud. In another embodiment, the Highlight Titles button may also be used with the operator 198 accessibility module and the color filters module 167 to highlight titles in various high contrast colors.

Figure 9:
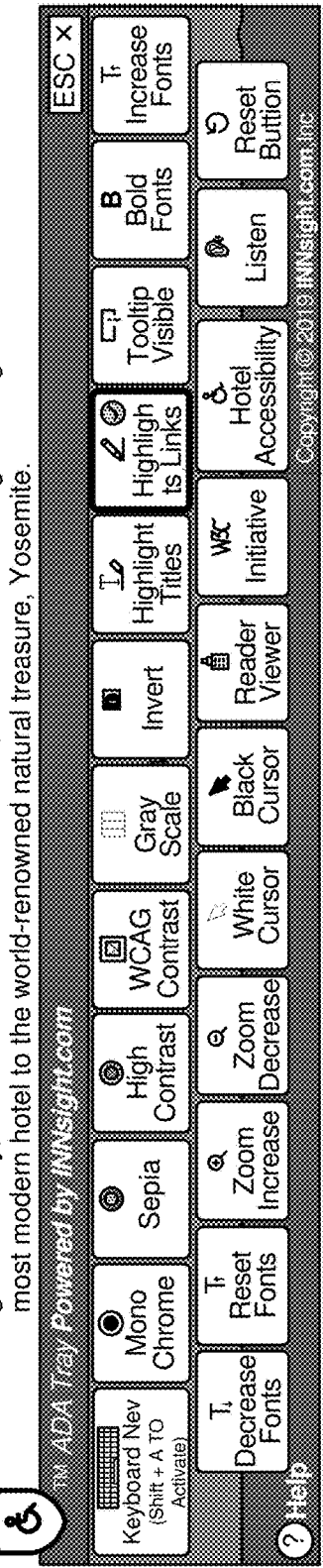
FIG. 9 is a screen shot of the highlight links accessibility module implemented on a web page.

Referring to FIG. 9, FIG. 9 is a screenshot 900 of the highlight links 191 accessibility module as it is being executed. As the Highlight Links button 905 is selected, all text 910 that links the user to another URL address is colorized with a different color background on the screen. This button may be used in combination with the operator 198 accessibility module and the listen 175 accessibility module to instruct the page to read all links aloud. This button may also be used in combination with the operator 198 accessibility module and color filter modules 167 to highlight links in various high contrast colors.

Referring to FIG. 10, FIG. 10 is a screenshot 1000 of the keyboard navigation 181 accessibility module as it is executed. As the Keyboard Nav button 1005 is selected, key combinations that execute accessibility modules are displayed 1010 above their respective buttons. This button 1005 may be used in combination with the operator 198 accessibility module and the listen 175 accessibility module to read the keyboard combinations aloud. This button 1005 may also be used in combination with the operator 198 accessibility module and the color filter modules 167 to color the keyboard combinations in high contrast colors that are easy to read.

Referring to FIG. 11, FIG. 11 is a screenshot 1100 of the cursor filter 179 accessibility module as it is executed. As the White Cursor button 1105 is selected, the cursor 1110 is larger with high contrast, making the cursor easier to see and track. This function may be used in combination with the keyboard navigation 181 module to type a key combination to find a cursor that is lost on the display. In one embodiment, a line is drawn from the cursor to the closest executable selection on the screen showing the client where the executable selection is. In another implementation of this embodiment, the closest executable selection can be executed by the user, allowing for users with low mobility to select objects on a screen without moving the cursor directly over them. In another implementation of this embodiment, the line can be cycled to the next closest selections to the cursor by using keyboard or other inputs.

Figure 12:
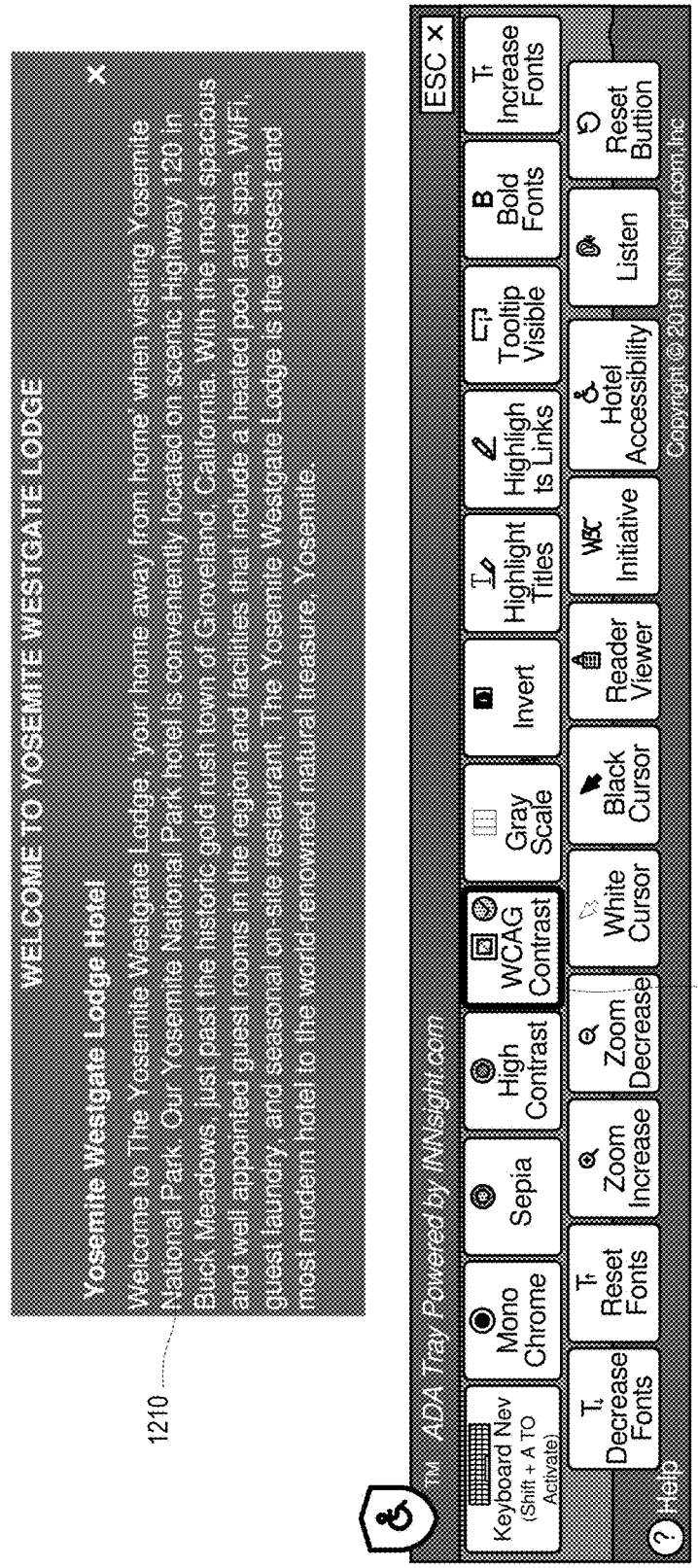
FIG. 12 is a screen shot of the WCAG contrast accessibility module implemented on a web page.

Referring to FIG. 12, FIG. 12 is a screenshot 1200 of the color filter 167 accessibility module as it is executed. As the WCAG contrast button 1205 is selected, the display color is filtered and contrast adjusted to make a web page 1210 more perceivable to individuals with visual impairment.

Figure 13:
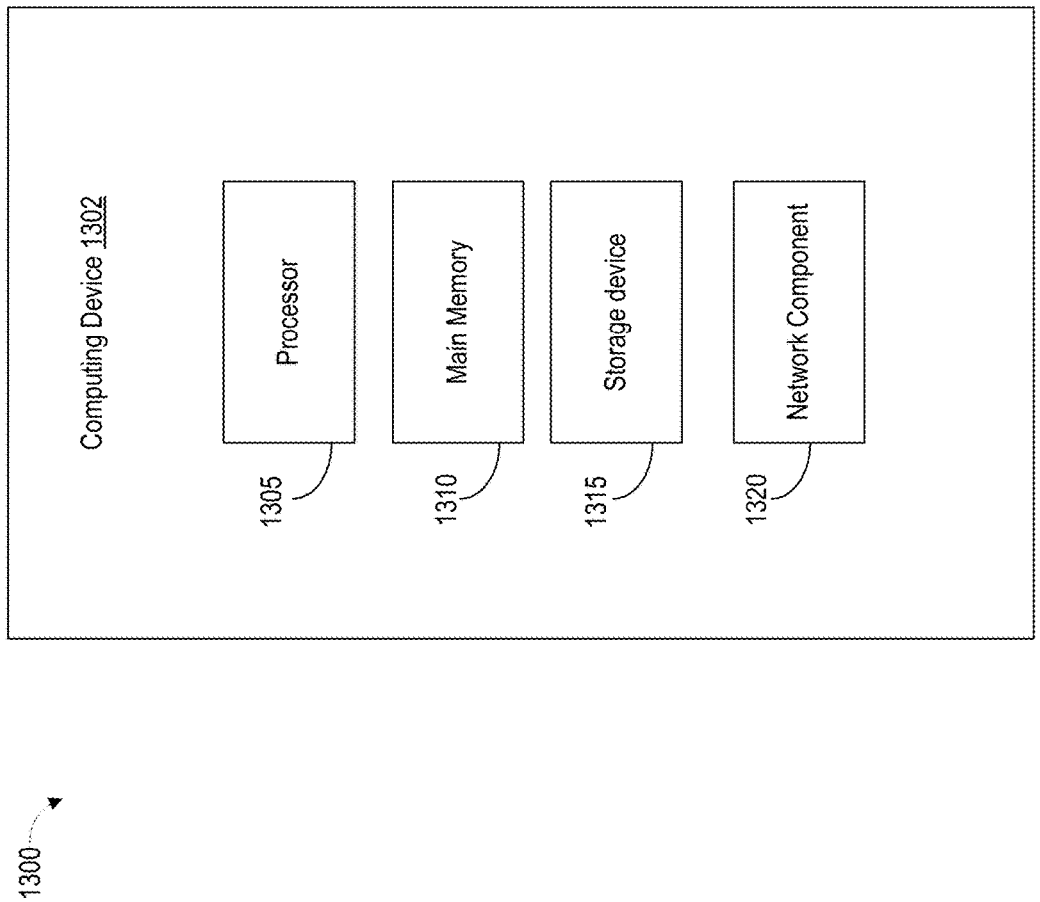
FIG. 13 is a schematic illustrating the computing components that may be used to implement various features of embodiments described in the present disclosure.

The host server 102, web page server 115, and client device 122 are forms of computing devices 1302 with hardware components as shown block diagram 1300 in FIG. 13. The computing devices 1302 have one or more processors 1305, main memory 1310, storage devices 1315, and network components 1320. The host server 102, web page server 115, and client device 122 may all be separate computing devices 1302, a single computing device 1302, or computing devices 1302 that share one or more components.

Each computing device 1302 has one or more processors 1305, main memory 1310, storage devices 1315, and one or more network components 1320. The processor 1305 is an electronic circuit that performs calculations and basic instructions in a computing device 1302. Common examples of processors include, but are not limited to, central processing units (CPU), graphics processing units (GPU), field programmable gate arrays (FPGA), and complex programmable logic devices (CPLD).

The processor 1305 has immediate and direct access to main memory 1310. Main memory 1310 is often called random access memory. A processor only has access to main memory 1310. Programs and applications are copied to the main memory 1310 before they interact with the processor 1305. Many forms of main memory 1310 only store memory while the computing device 1302 is powered.

Computing devices 1302 may have storage 1315, including, but not limited to hard disk drives, solid state drives, flash memory, floppy disk drives, and compact disks. A processor 1305 does not have direct access to storage 1315, however storage devices 1315 tend to be cheaper and have more capacity than an equivalent amount of main memory 1310. Web page components 120 and accessibility modules 127 will typically be kept on storage devices 1315 until they are needed, at which point, they will be transmitted into main memory 1310.

The computing devices 1302 have one or more network components 1320 that allow them to communicate with other computing devices 1302. A person skilled in the art will understand how to implement a network component 1320 on a computing device 1302. In one embodiment, the host server 102, web page server 115 and client device 122 all communicate through a TCP/IP network component 1320.

Figure 14:
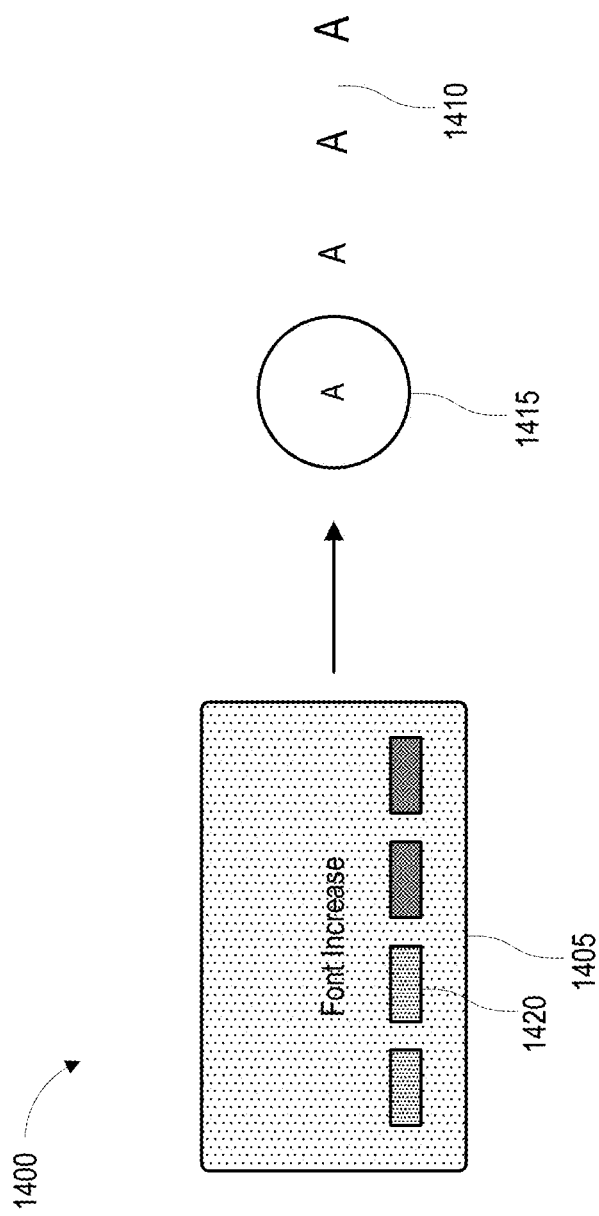
FIG. 14 is an image of a graphical representation of accessibility module settings.

Referring to FIG. 14, an image 1400 of a graphical representation of accessibility module settings. Accessibility modules 140 may be configured to display selectable settings, giving the user fine control over the execution of the accessibility module. In one embodiment, shown in FIG. 14, a graphical representation of selectable settings is displayed, showing the user the display modifications that the accessibility module could bring into effect. An example of a graphical representation of a selectable setting for the Font Increase button 1405 is shown in FIG. 14. When the Font Increase button 1405 is selected, a display window shows text in various font sizes 1410 that are selectable and represent the font sizes that could be displayed on the web page by the increase fonts 185 accessibility module. To ease use, the currently selected setting is indicated 1415 in the graphical representation. A smaller abstract representation 1420 of the current setting may be displayed on the button.

Another implementation of a graphical representation of a selectable setting for the color filter 167 accessibility module is a color selector, such as a color wheel, that displays every combination of red, green, and blue colors in a compact window. For example, when a graphical representation of a color selector is applied to the Mono Chrome button 608, a user may select the preferred color on the color selector to display the web page in the hue of the selected color. This gives users who perceive colors differently an improved ability to fine tune the color scheme of a web page to their preference. Other modules may make use of a color selector, such as the tooltip visible 171, cursor filter 179, highlight titles 183, and highlight links 191 accessibility modules.

This description of the embodiments is not intended to be limiting, but is instead meant to illustrate the principles and concepts herein. The embodiments herein may be implemented without limitation or confinement to this disclosure. Rather, the many embodiments are intended to guide a person skilled in the art such that they may combine embodiments or derive additional embodiments consistent with this disclosure.

Figure 15:
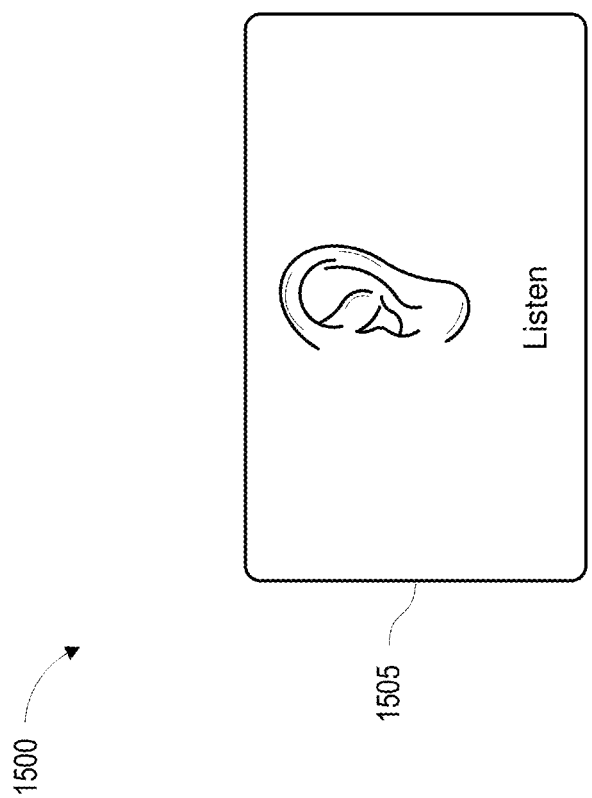
FIG. 15 is an image of a listen button as it is displayed on a client screen.

Referring to FIG. 15, an image of a listen button 1500, which executes a listen 175 accessibility module when selected by the client user. When selected by the client user, the listen button 1505 executes the listen 175 accessibility module, which instructs the web page to be read aloud via the speaker 157 of the client device 122. Selecting the listen button 1505 again stops the listen module 175 from reading aloud.

Figure 16:
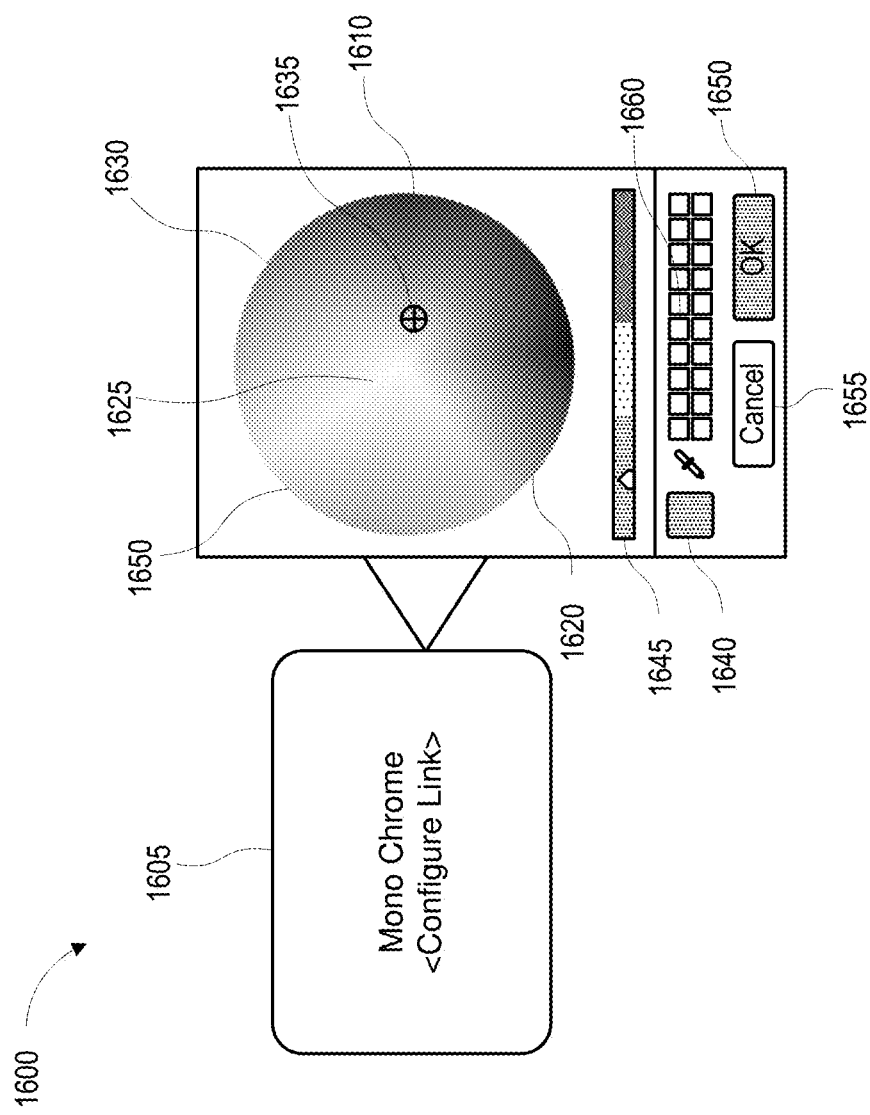
FIG. 16 is an image of the graphical representation of the selectable setting for a color selector of a Mono Chrome button as it is displayed on a client screen.

Referring to FIG. 16, an image of the graphical representation of the selectable setting for a color selector 1600 of a Mono Chrome button 1605 as it is displayed on a client display. In the embodiment of a color selector shown in FIG. 16, a color wheel displays combinations of red, green and blue in a selectable circle. On the outside of the circle are the three primary colors: red 1610, green 1615, and blue 1620, placed equidistantly from each other. White 1625 is in the middle. The outside of the color wheel displays the graduation of primary colors as they combine into one another. At the location in between the primary colors on the outside of the circle are combinations of primary colors. For example, yellow 1630, is the combination of red 1610 and green 1615. Going from the outside of the circle to the center, all colors are gradually increased until the maximum level of red 1610, green 1615, and blue 1620 is reached to produce white 1625. Any color on the wheel can be selected. Once selected, a target 1635 indicates the location of the color selected and a color square 1640 displays the picked color. The picked color may be further adjusted by changing the brightness setting 1645, which lightens and darkens the selected color 1635 while maintaining the same color hue. Once the client user selects the preferred color, the "OK" button 1650 may be selected to execute the monochrome color filter 167 accessibility module for the selected color. Selecting the "Cancel" button 1655 would close the color selector. A multitude of the client user's preferred colors may be saved by selecting the save color buttons 1660.

Figure 17:
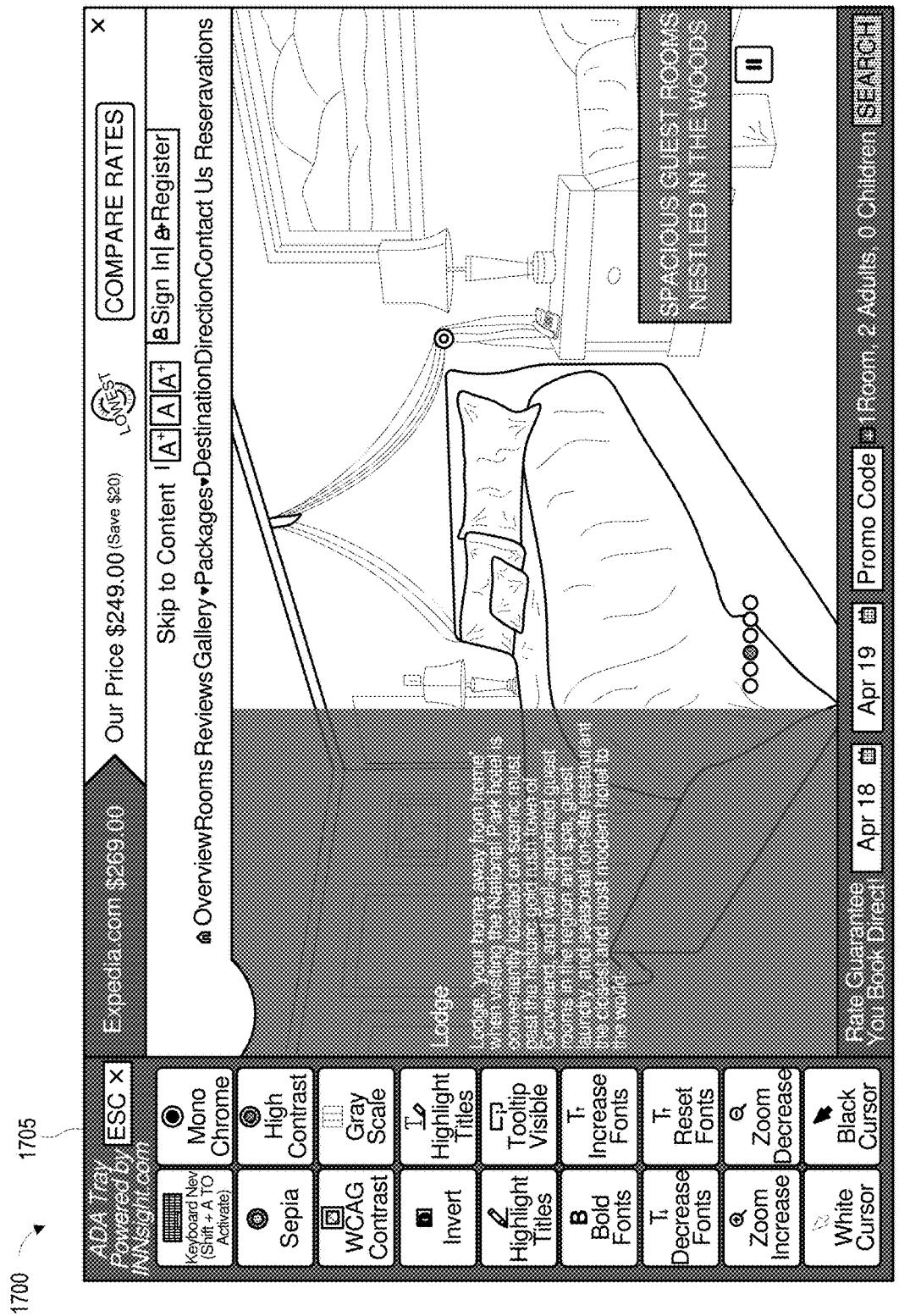
FIG. 17 is a screen shot showing the accessibility modules on a web page with the tray position on the left.

Referring to FIG. 17, FIG. 17 illustrates a screen shot of a web page 1700 with a rectangular tray 1705 placed on the left side of the page. The tray position 330 may be set in the content management system 300 by selected left for the tray position 420 on the content management user interface screen. The best location for the tray 1705 may be different for each web page based on aesthetics and accessibility.

Figure 18:
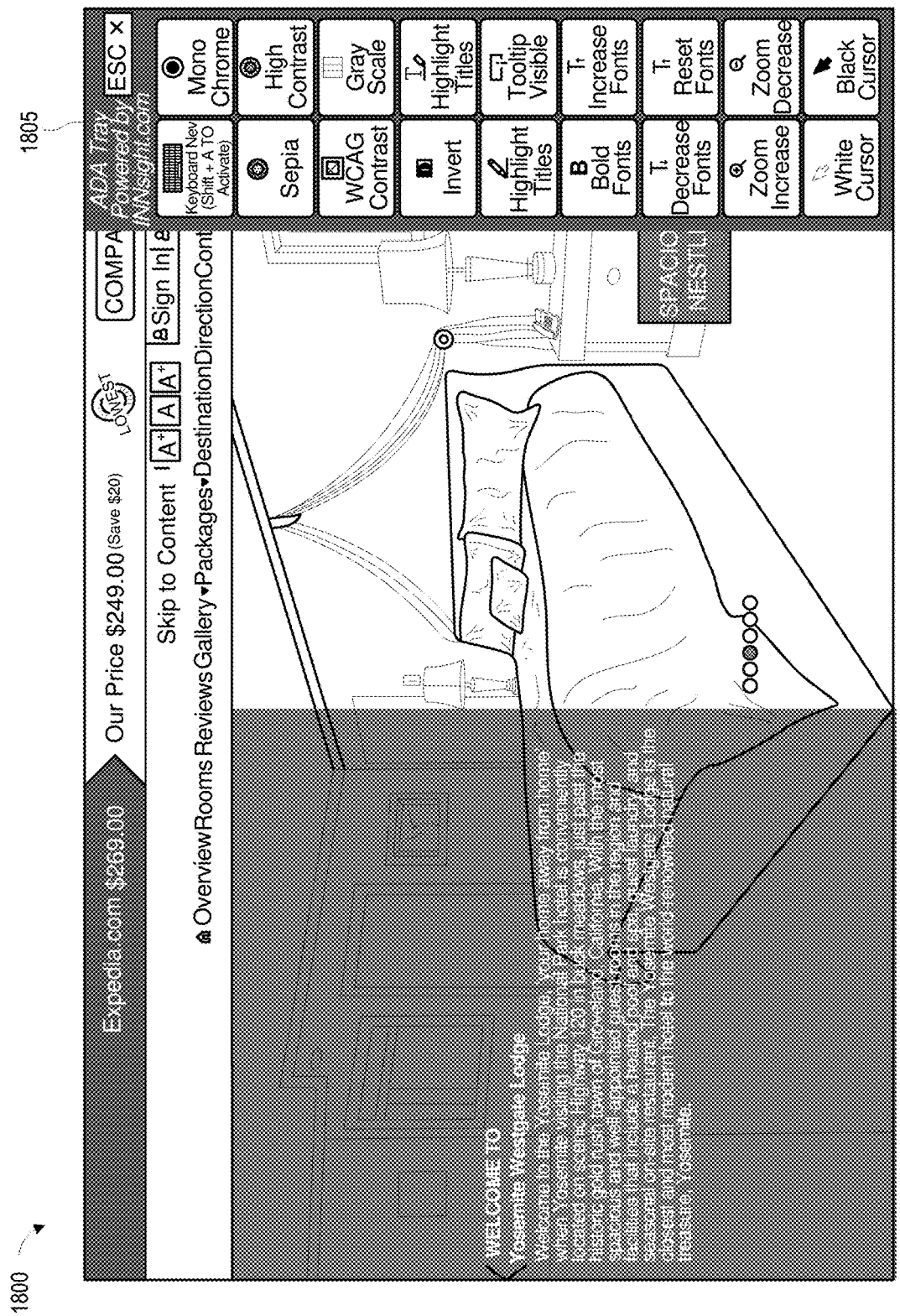
FIG. 18 is a screen shot showing the accessibility modules on a web page with the tray position on the right.

Referring to FIG. 18, FIG. 18 illustrates a screen shot of a web page 1800 with a rectangular tray 1805 placed on the right side of the page. A tray position 330 on the right side of the page may be most useful for web pages where the content focuses on the left side of the page.

Figure 19A:
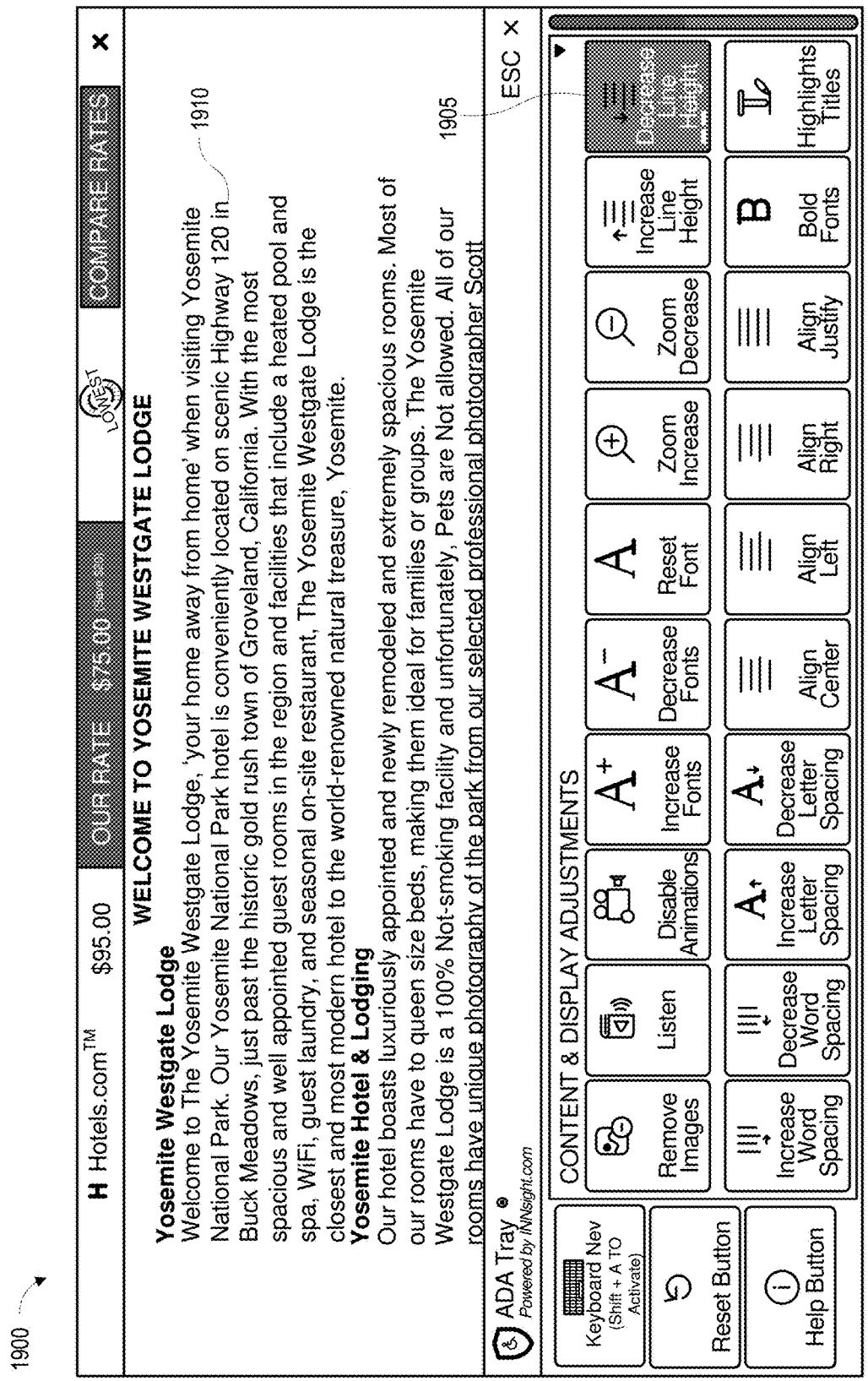
FIG. 19A is a screen shot illustrating of a decrease line height button, which implements an adjust line height accessibility module.

Referring to FIG. 19A, FIG. 19A is a screen shot 1900 illustrating a decrease line height button 1905, which implements an adjust line height 168 accessibility module. In an exemplary embodiment, the decrease line height button 1905 provides the ability to decrease the line spacing between text up to five points in order to provide enhanced readability of all content on the web page.

As shown in FIG. 19A, the decrease line height button 1905 is highlighted and has been selected. In an exemplary embodiment that is shown in FIG. 19A, the decrease line height button 1905 may be selected multiple times to further decrease the spacing between lines with each selection. The two dashes in the decrease line height button 1905 indicate that the decrease line height button 1905 has been selected twice, thus decreasing the spacing between lines by two points. The spacing between lines of text 1910 has been decreased by two points, as directed by the user.

Figure 19B:
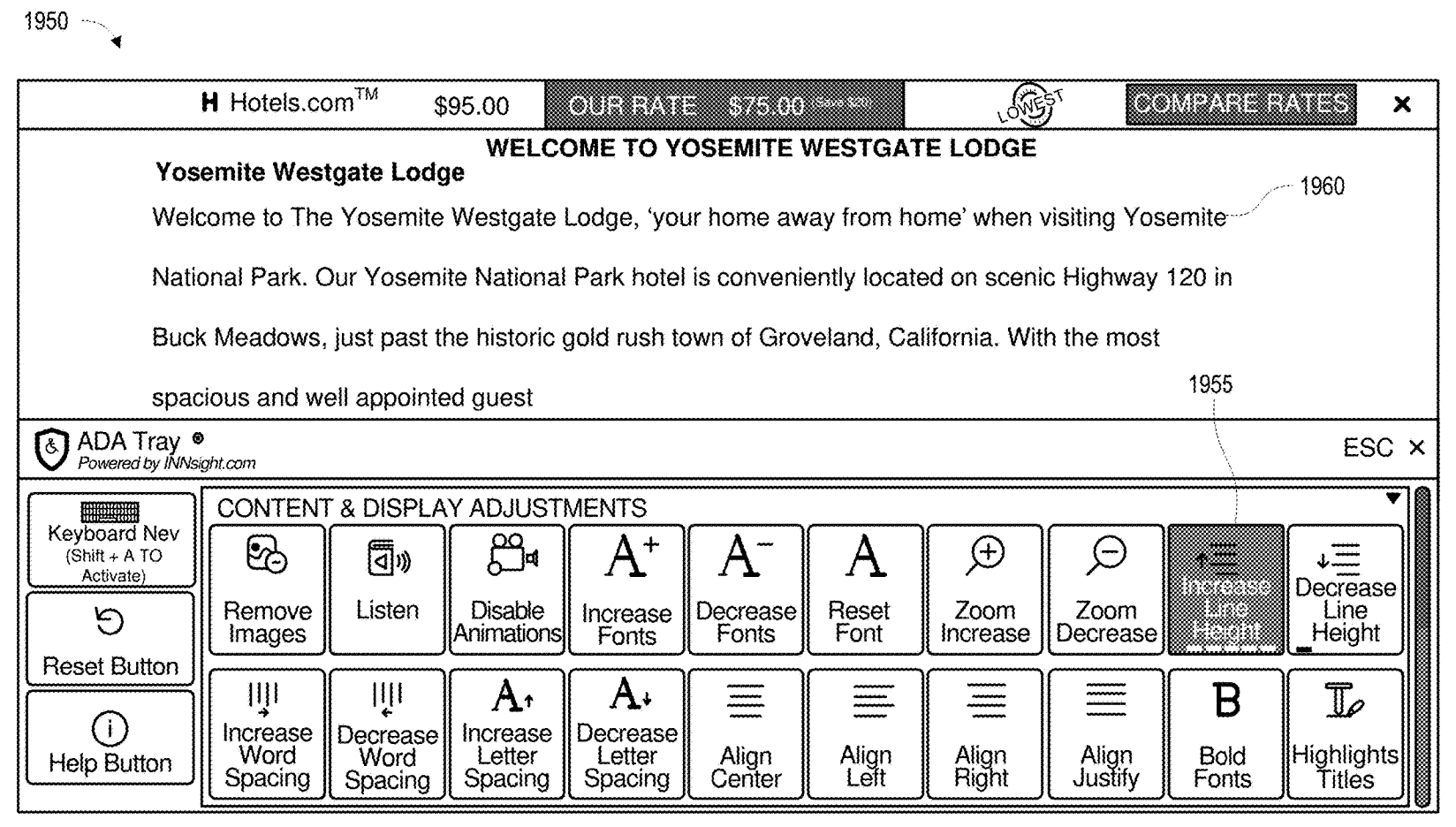

Referring to FIG. 19B, FIG. 19B is a screen shot 1950 illustrating an increase line height button 1955, which implements an adjust line height 168 accessibility module. In the exemplary embodiment that is shown in FIG. 19B, the adjust line height 168 accessibility module is implanted as two buttons to give the user control over the spacing between lines on the web page in the screen shot 1950. The decrease line height button 1905 and increase line height button 1955 allow the user to precisely adjust and experiment with line spacing to achieve a preferred line spacing for enhanced readability.

As shown by the highlighting of the increase line height button 1955 in the screen shot 1950, the increase line height button 1955 has been activated by the user to increase the spacing between lines of text. The five dashes within the increase line height button 1955 indicate that the user has selected the increase line height button 1955 five times to increase the spacing between lines of text 1960 by five points. As such the text 1960 of the screen shot 1950 has noticeably greater spacing between lines when the increase line height button 1955 has been activated than when the text 1910 of the screen shot 1900 where the decrease line height button 1905 has been activated.

Figure 20A:
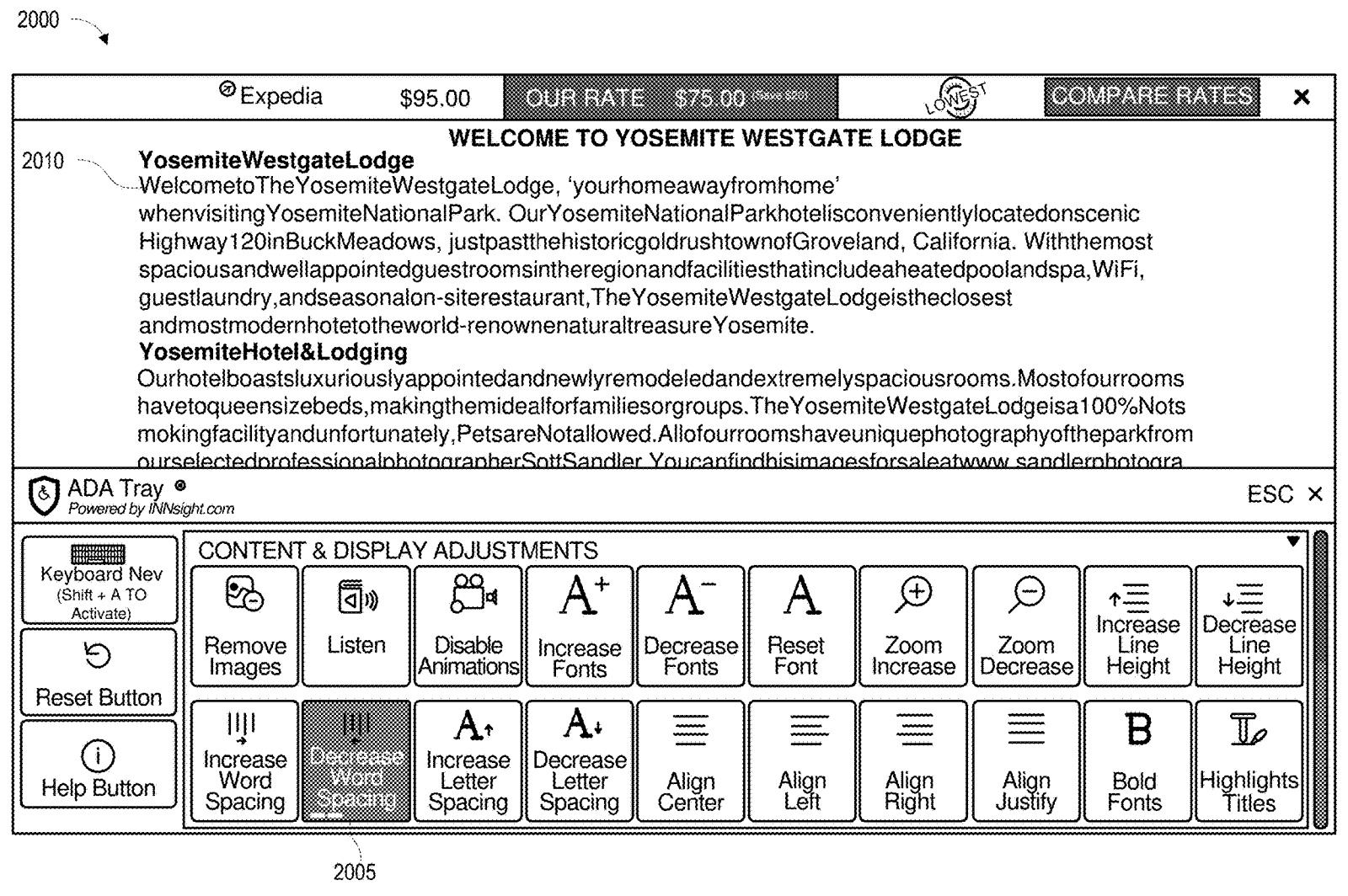

Referring to FIG. 20A, FIG. 20A is a screen shot 2000 illustrating a decrease word spacing button 2005, which implements an adjust word spacing 170 accessibility module. In the implementation of the adjust word spacing 170 accessibility module shown in FIG. 20A, the adjust word spacing 170 accessibility module is split into two buttons, an increase word spacing button 2055 and a decrease word spacing button 2005. In an exemplary embodiment, activating the decrease word spacing button 2005 incrementally decreases the spacing between whole words of text on the web page.

As shown by the highlighting of the decrease word spacing button 2005 in the screen shot 2000, a user has activated the decrease word spacing button 2005. The two dashes in the decrease word spacing button 2005 indicate that it was selected twice by the user to decrease the spacing between words two consecutive times. And as shown by the text 2010 in the screen shot 2000, the spacing between whole words has been decreased.

Figure 20B:
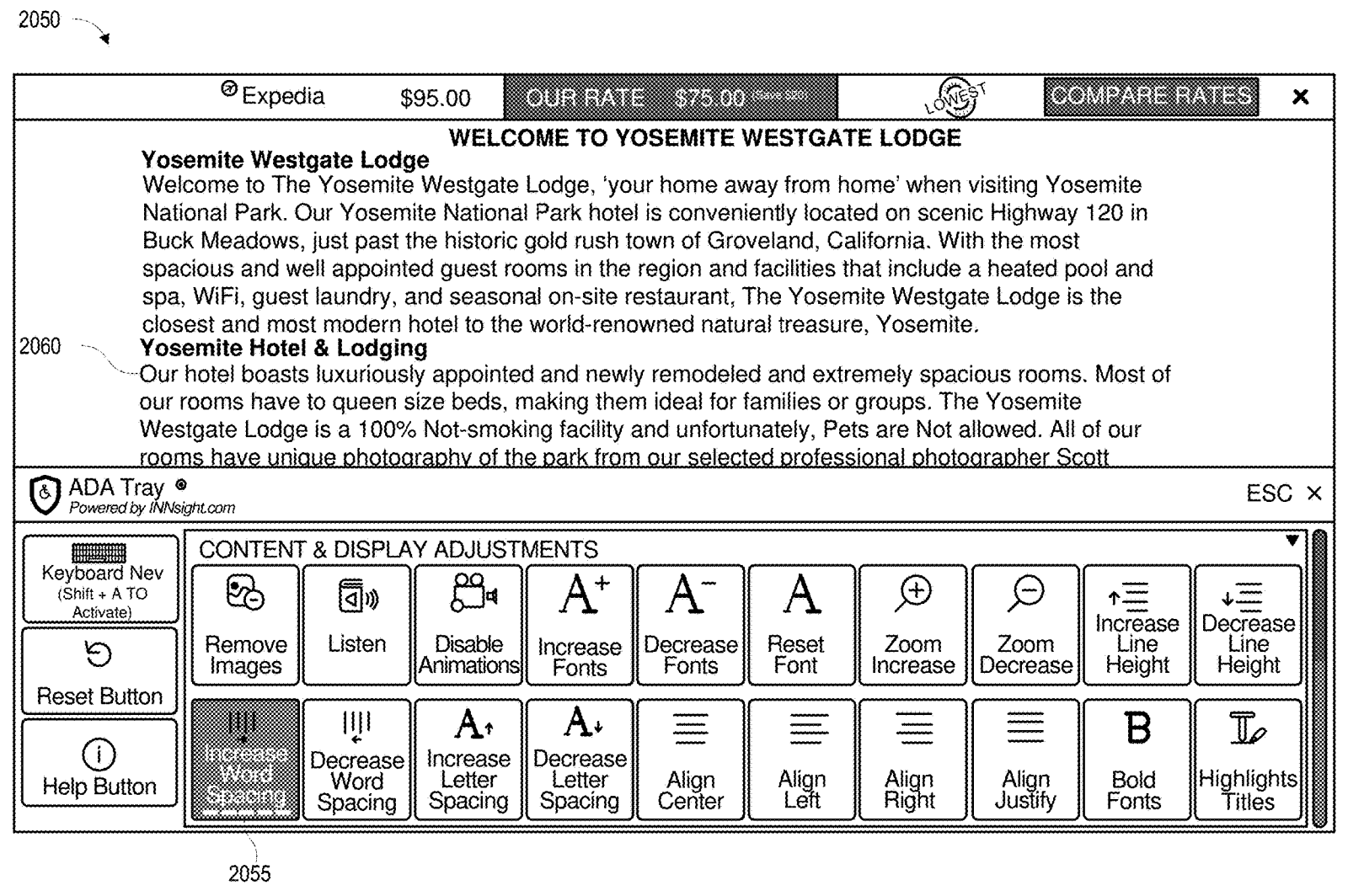

Referring to FIG. 20B, FIG. 20B is a screen shot 2050 illustrating an increase word spacing button 2055, which implements an adjust word spacing 170 accessibility module. The increase word spacing button 2055, like the decrease word spacing button 2005, implements the adjust word spacing 170 accessibility module. In an exemplary embodiment, selecting the increase word spacing button 2055 incrementally increases the spacing between whole words of text 2060 on a web page.

As indicated by the highlighting of the increase word spacing button 2055 in the screen shot 2050, the increase word spacing button 2055 has been selected by a user. The five dashes in the increase word spacing button 2055 indicate that the increase word spacing button 2055 has been selected five times, which incrementally increases the spacing between words five times. The increased spacing between whole words may increase the readability for users with sight disabilities. As shown in the screen shot 2050 of FIG. 20B, the spacing between whole words of the text 2060 is larger than the spacing between whole words of the text 2010 in the screen shot 2000 of FIG. 20A.

Figure 21A:
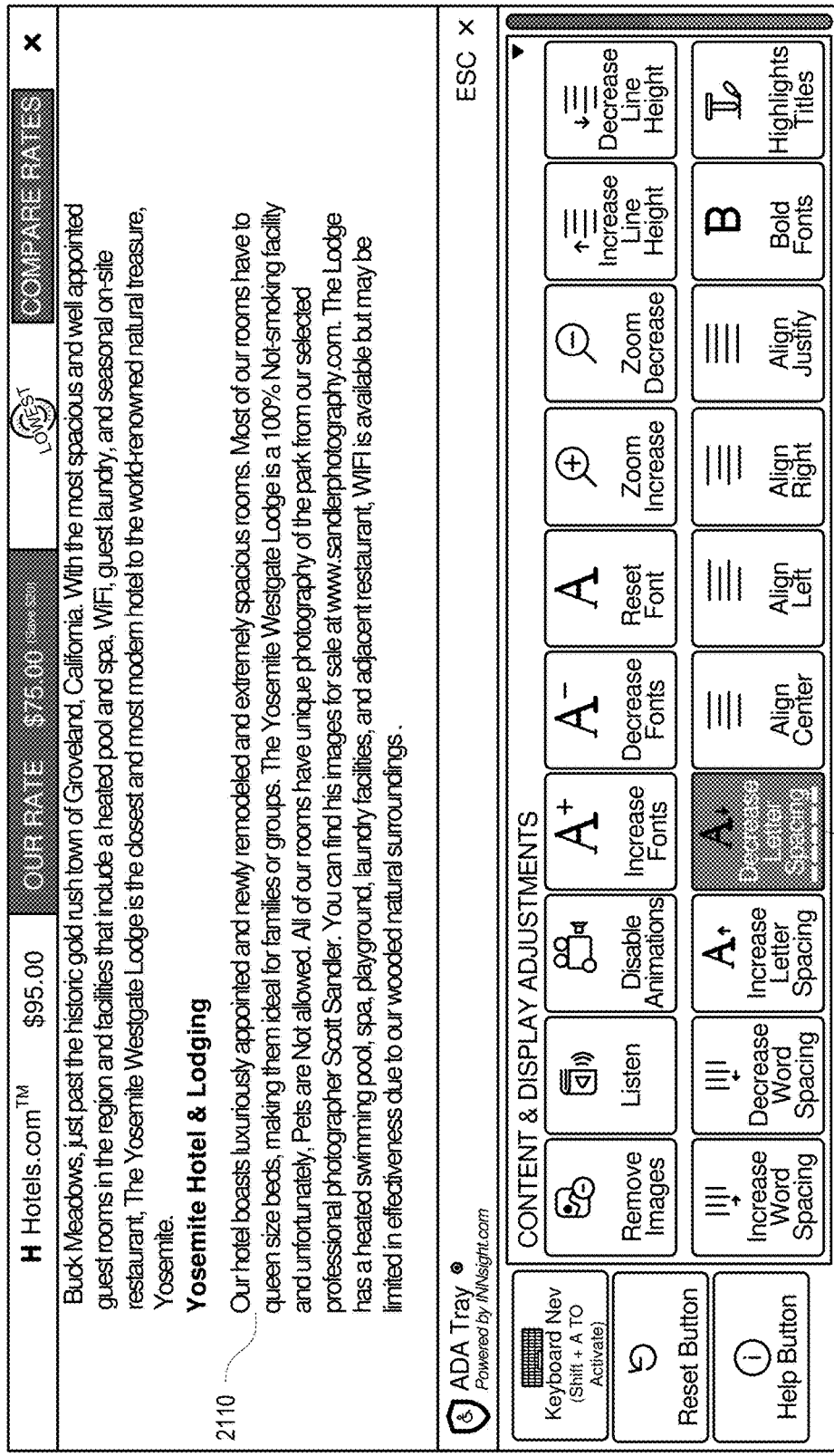
FIG. 21A is a screen shot illustrating an increase letter spacing button, which implements the adjust letter spacing accessibility module to incrementally increase the spacing between letters of text on a web page.

Referring to FIG. 21A, FIG. 21A is a screen shot 2100 illustrating a decrease letter spacing button 2105, which implements an adjust letter spacing 172 accessibility module. The ability to adjust the spacing of letters in the text of a web page to a preferred letter spacing improves readability for users with disabilities relating to sight and focus. In the exemplary embodiment shown in the screen shot 2100, the adjust letter spacing 172 accessibility module is implemented as two buttons, a decrease letter spacing button 2105 and an increase letter spacing button 2155. The decrease letter spacing button 2105, when activated, incrementally decreases the spacing between letters of text 2110.

As indicated by the highlighting on the decrease letter spacing button 2105 in the screen shot 2100, the decrease letter spacing button 2105 has been activated by a user. The five dashes on the highlighted decrease letter spacing button 2105 indicate that the user has activated the decrease letter spacing button 2105 five times to decrease the space in between letters five separate times. The spaces between the letters of text 2110 have been thus decreased.

Figure 21B:
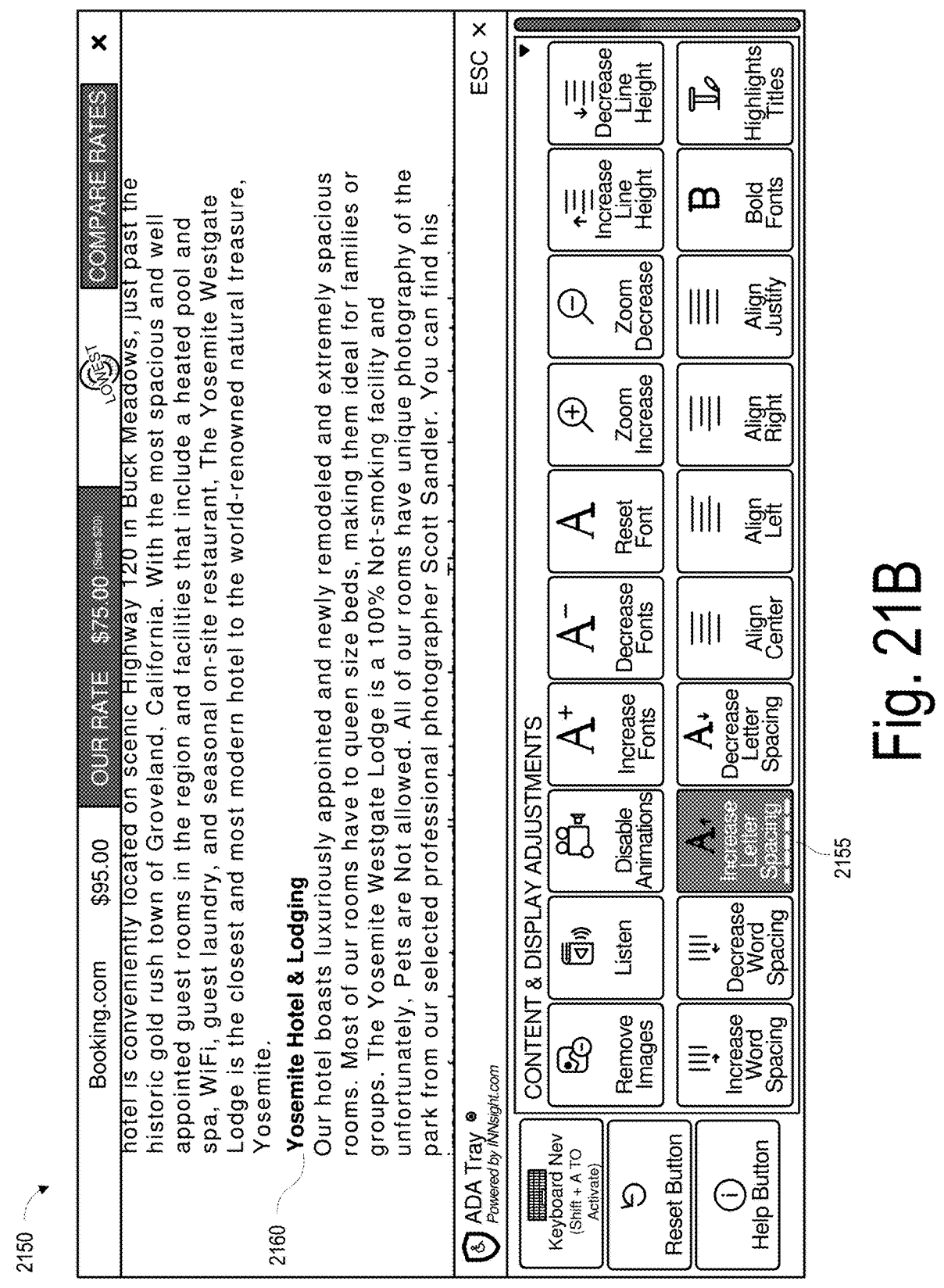

Referring to FIG. 21B, FIG. 21B is a screen shot 2150 illustrating an increase letter spacing button 2155, which implements the adjust letter spacing 172 accessibility module to incrementally increase the spacing between letters of text 2160 on a web page. Like the decrease letter spacing button 2105, the increase letter spacing button 2155 implements the adjust letter spacing 172 accessibility module to change the spacing of letters of text 2160 on a web page by a set amount. When the decrease letter spacing button 2105 and increase letter spacing button 2155 are used together, a user may experiment to discover a letter spacing of text 2160 that the user finds most preferable.

As shown by the highlighting of the increase letter spacing button 2155 in the screen shot 2150, the increase letter spacing button 2155 has been activated by the user. The five dashes on the increase letter spacing button 2155 indicate that it has been activated five times by a user to incrementally increase the spacing between letters of the text 2160 five separate times. The spacing between the letters of text 2160 in the screen shot 2150 of FIG. 21B is thus greater than the spacing between the letters of text 2110 in the screen shot 2100 shown in FIG. 21A.

Figure 22A:
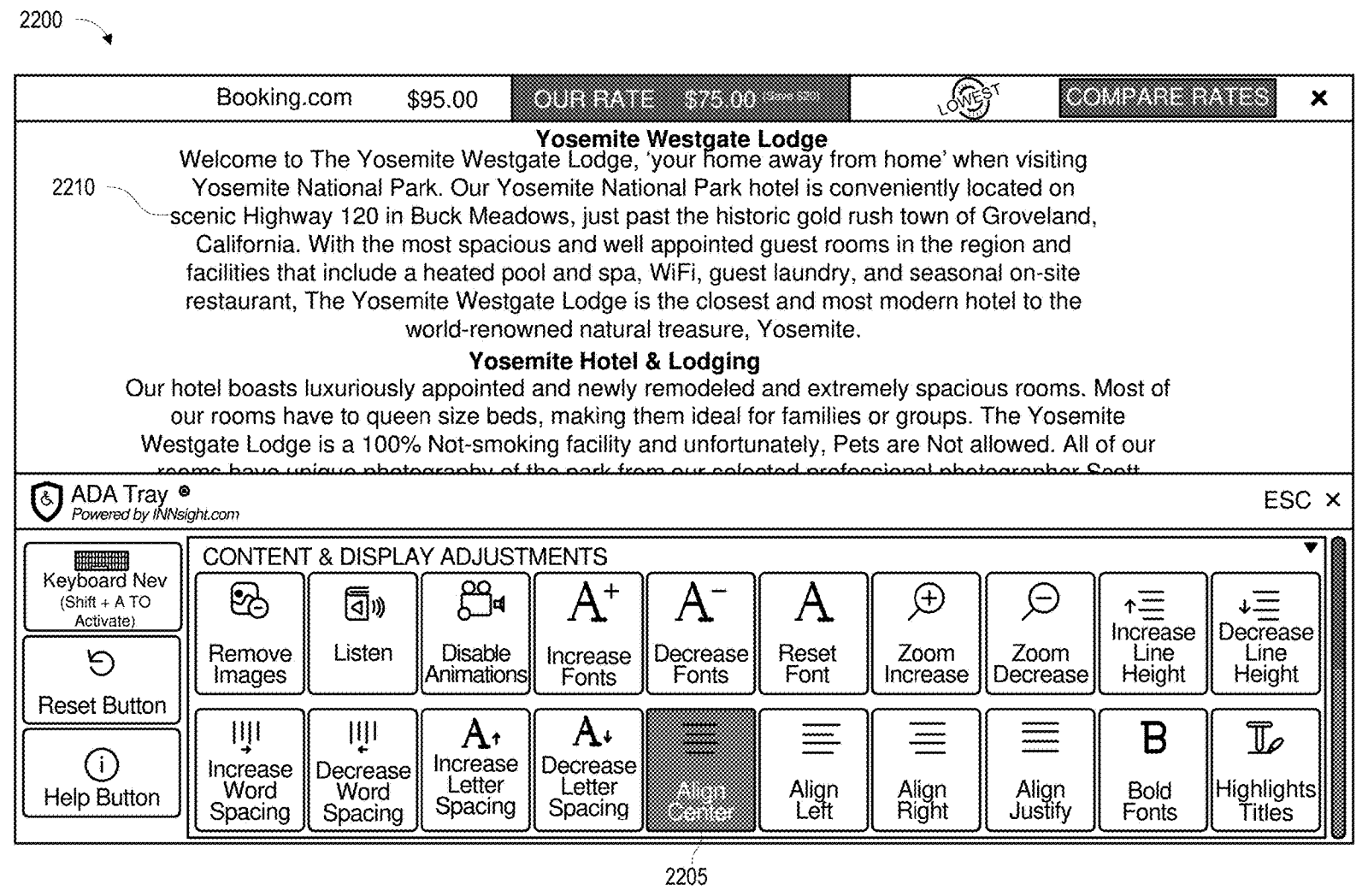

Referring to FIG. 22A, FIG. 22A is a screen shot 2200 that illustrates an implementation of the change alignment 174 accessibility module. The change alignment 174 accessibility module may change the alignment of the text 2210 on a web page to various alignments such as "align left", "align right", "align center", and "align justify". In an exemplary embodiment, the functions of the change alignment 174 accessibility module may be split between multiple buttons, each of which activates a different alignment of text. The align center button 2205 changes the alignment of text 2210 to an "align center" alignment.

As indicated by the highlighting on the align center button 2205 in the screen shot 2200, the align center button 2205 has been activated by the user. The align center button 2205 may be configured to implement the change alignment 174 accessibility module to cancel the previous text alignment and activate a center alignment of text 2210 on the web page. As shown in the screen shot 2200, the text 2210 has been center aligned.

Figure 22B:
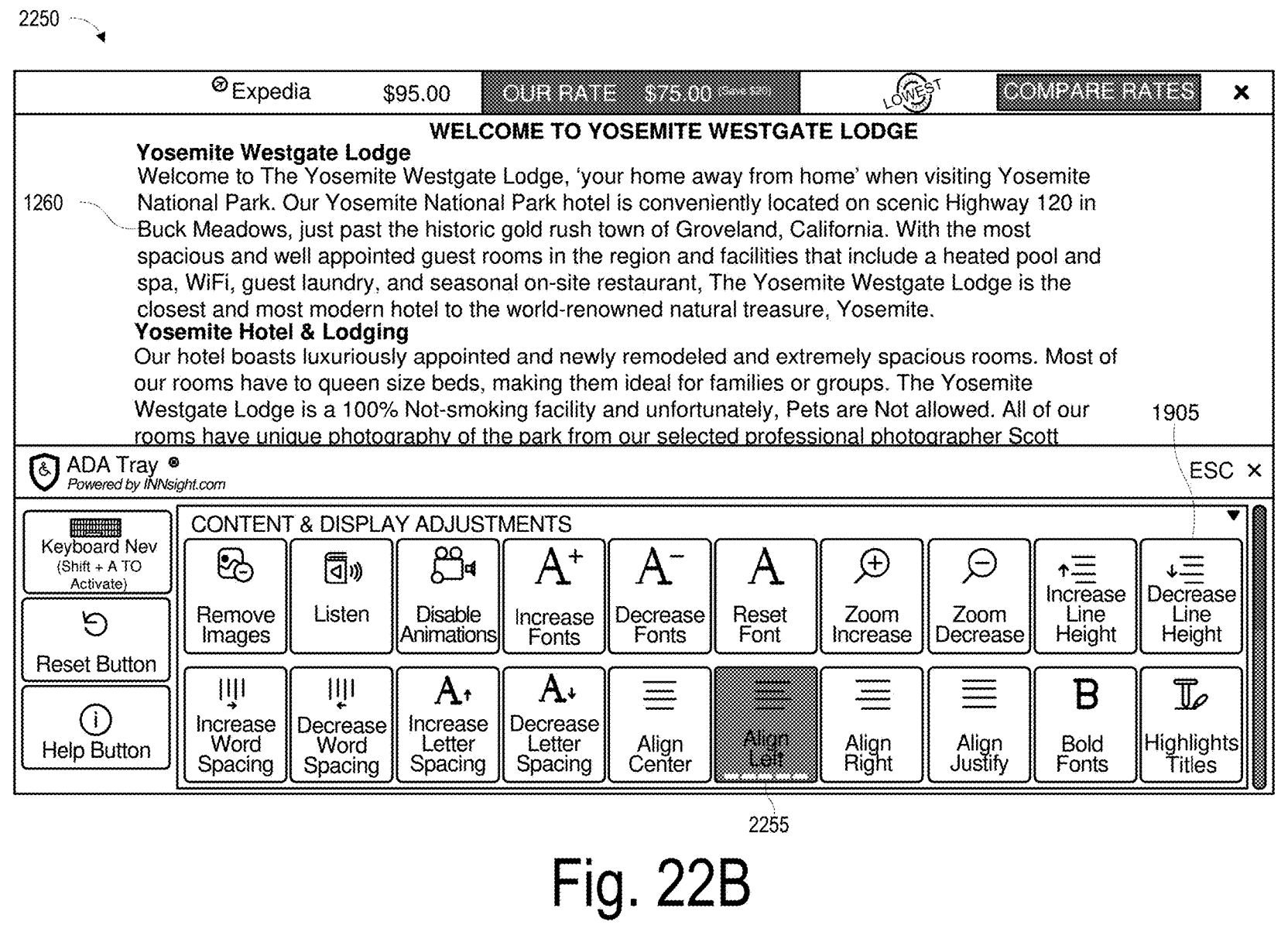

Referring to FIG. 22B, FIG. 22B is a screen shot 2250 that illustrates an implementation of the change alignment 174 accessibility module. The align left button 2255, when activated, implements the change alignment 174 accessibility module to change the alignment of text 2260 on a web page to a left alignment. Previously activated alignments may be cancelled when the align left button 2255 is activated.

As shown by the highlighting of the align left button 2255 in the screen shot 2250 of FIG. 22B, the align left button 2255 has been activated by a user. The align left button 2255 may be activated through input 158 such as a mouse click, touch or voice command. Any previous alignment of the text 2260 would be cancelled when the align left button 2255 is activated. As shown in the screen shot 2250, the text 2260 has been aligned to the left.

Figure 23A:
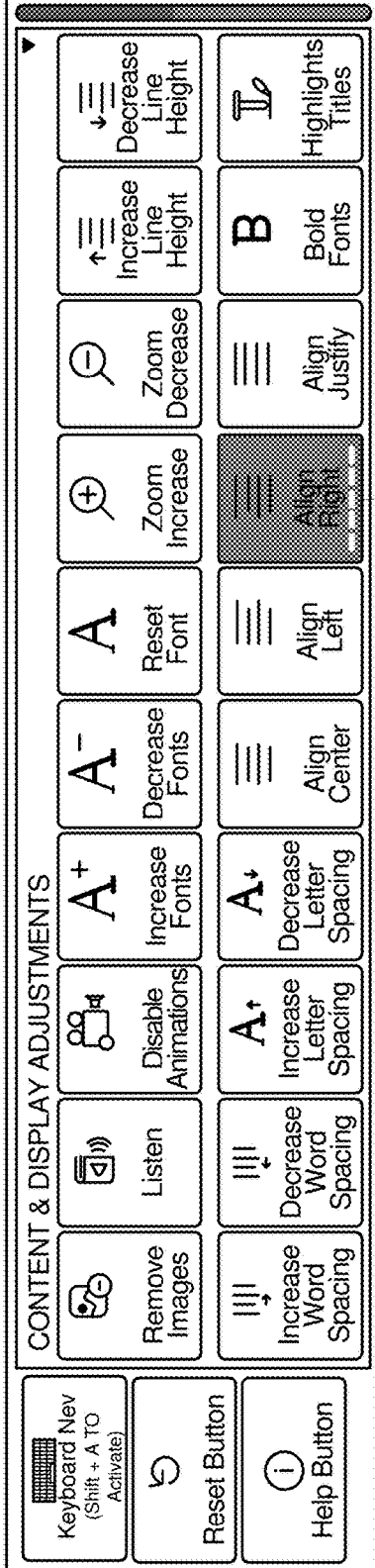
FIG. 23A is a screen shot that illustrates an implementation of the change alignment accessibility module.

Referring to FIG. 23A, FIG. 23A is a screen shot 2300 that illustrates an implementation of the change alignment 174 accessibility module. An align right button 2305, when activated by a user, may implement the change alignment 174 accessibility module to change to the alignment of the text 2310 to a right alignment. Activation of the align right button 2305 may cancel a previous alignment of the text 2310, which allows the user to experiment with the alignment to determine a preferred alignment.

As shown by the highlighting of the align right button 2305 in the screen shot 2300 of FIG. 23A, the align right button 2305 has been selected by a user. The user may select and activate the align right button 2305 by clicking, touching, or other method of input 158 that selects objects on a screen. The change alignment 174 accessibility module may change the alignment of the text 2310 to a right alignment, as shown in the screen shot 2300 of FIG. 23A.

Figure 23B:
FIG. 23B is a screen shot the illustrates an implementation of the change alignment accessibility module.

Referring to FIG. 23B, FIG. 23B is a screen shot 2350 the illustrates an implementation of the change alignment 174 accessibility module with a justified alignment. An align justify button 2355, may be selected by a user to implement the change alignment 174 accessibility module to cancel a previous alignment of text 2360 on a web page and align the text to a justified alignment. The justified alignment of text adjusts the letter spacing and word spacing to align the edges of the text with the left and right margins.

As shown by the highlighting of the align justify button 2355 in the screen shot 2350, the align justify button 2355 has been selected by a user to activate the change alignment 174 accessibility module to change the alignment of text 2360. A justified alignment of text 2360, where text is aligned with the left and right margins, may improve the readability of the text 2360 for users with various disabilities.

Figure 24:
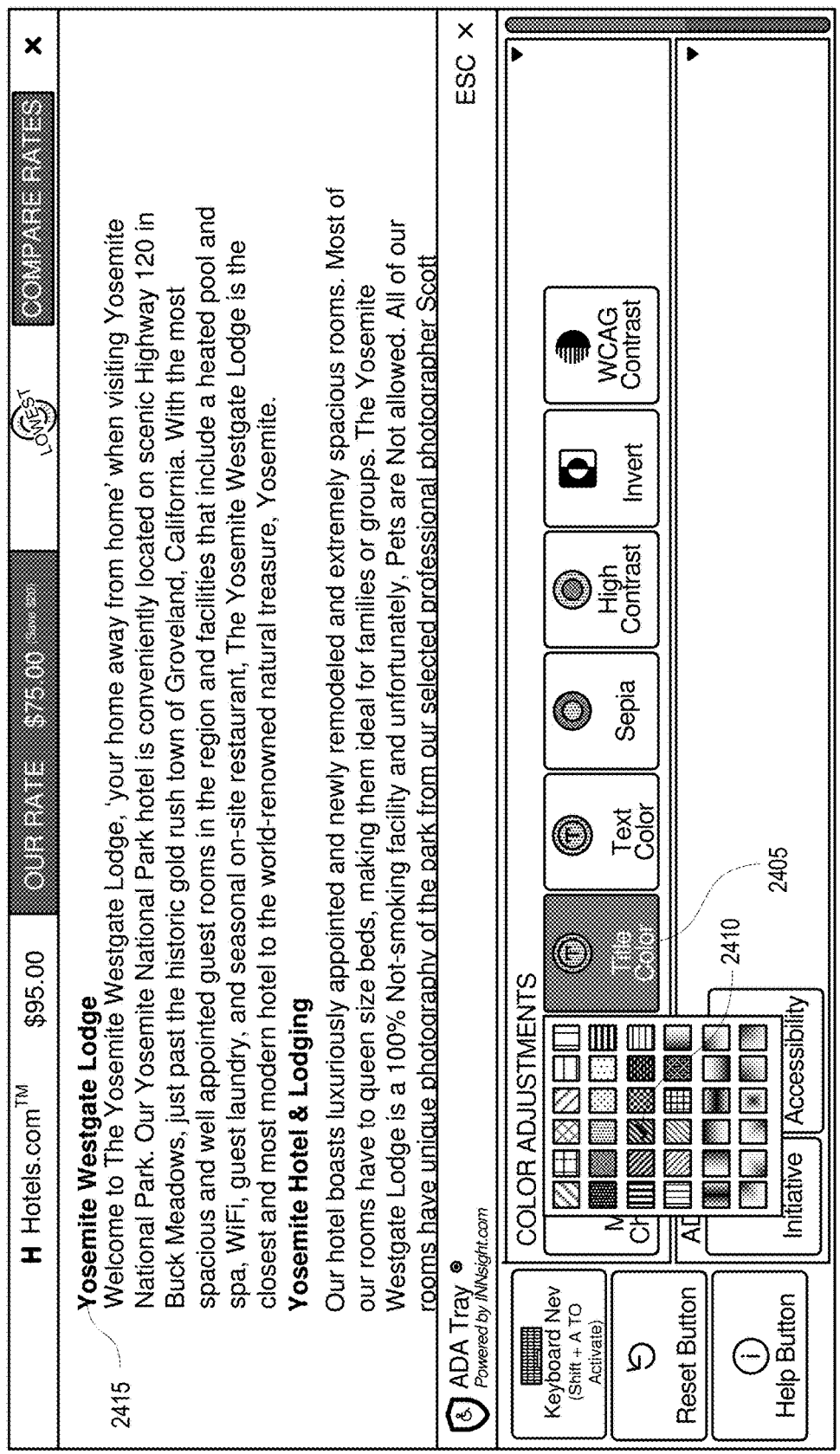
FIG. 24 is a screen shot that illustrates an implementation of the change title color accessibility module.

Referring to FIG. 24, FIG. 24 is a screen shot 2400 that illustrates an implementation of the change title color 176 accessibility module. The ability to modify the color of text on a web page may improve readability for users. Users may select a preferred color of text or experiment with colors to determine a preferred color of text. The title color button 2405 implements the change title color 176 accessibility module to change the color of text with a title tag in a web page. Changing the color of titles allows the user to differentiate titles from body text.

As shown by the highlighting of the title color, the title color button 2405 has been selected by the user. In an exemplary embodiment of the change title color 176 accessibility module that is shown in the screen shot 2400 of FIG. 24, a color picker 2410 is displayed in response to selecting the title color button 2405. A check mark indicates a color that was selected by the user. The color of titles 2415 in the text of the web page may change to the color that was selected by the user.

Figure 25:
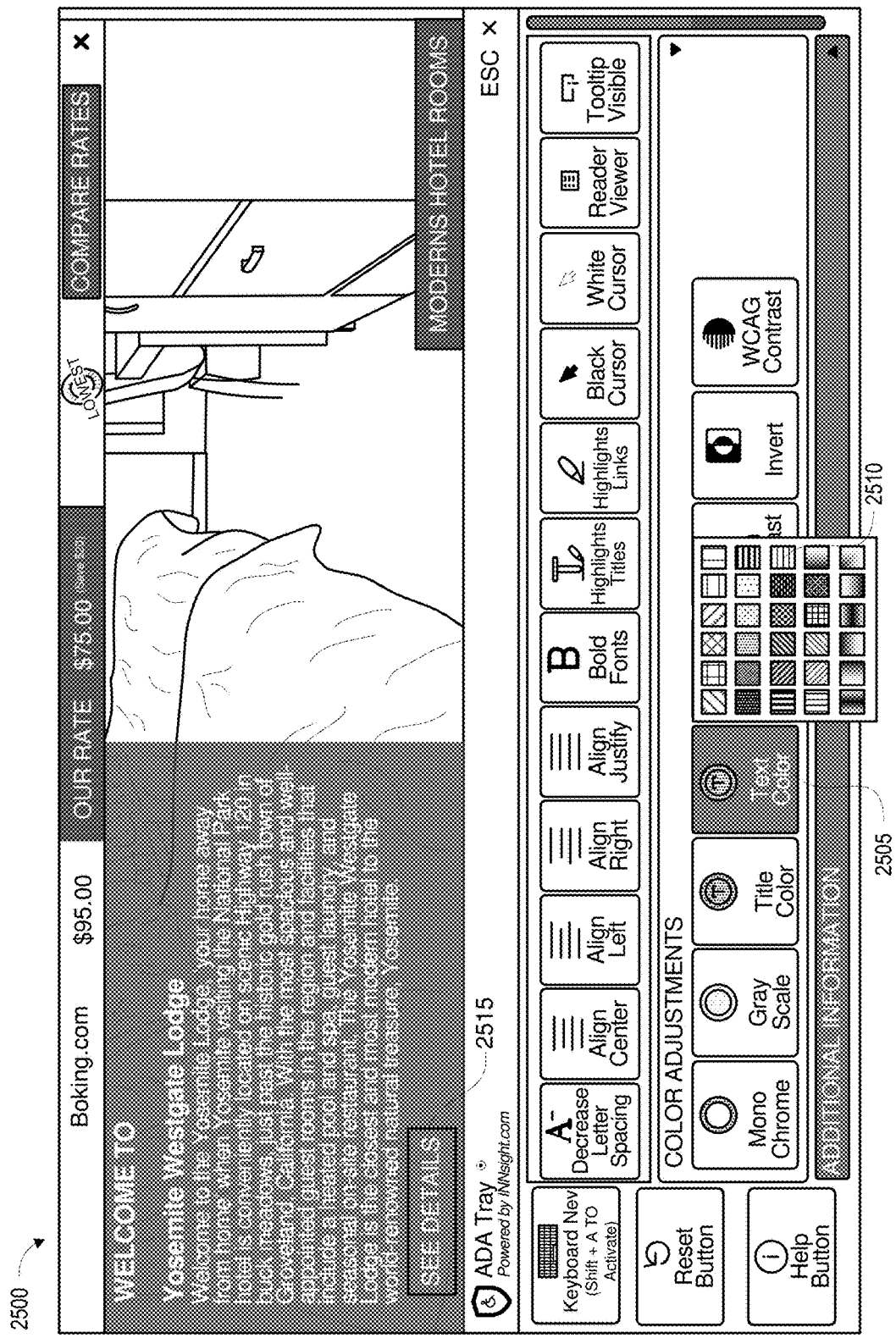
FIG. 25 is a screen shot that illustrates an implementation of the change text color accessibility module.

Referring to FIG. 25, FIG. 25 is a screen shot 2500 that illustrates an implementation of the change text color 178 accessibility module. The color of text 2515 on a web page may impact the readability of the text 2515 for users with various disabilities. The ability to modify and/or experiment with the color of the text 2515 enables those users to change the web page into a more readable form. A text color button 2505, that is selectable by the user, may implement the change text color 178 accessibility module.

As indicated by the highlighting of a text color button 2505 in the screen shot 2500, the user has selected the text color button 2505 to change the color of text 2515 on a web page that is displayed. In response to the selection of the text color button 2505, the change text color 178 accessibility module may display a color picker 2510 that allows a user to view and select a color of text. As indicated by the check mark in the color picker 2510, the user has selected a color that will be implemented by the change text color 178 accessibility module to change the color of the text 2515 in the web page.

Figure 26:
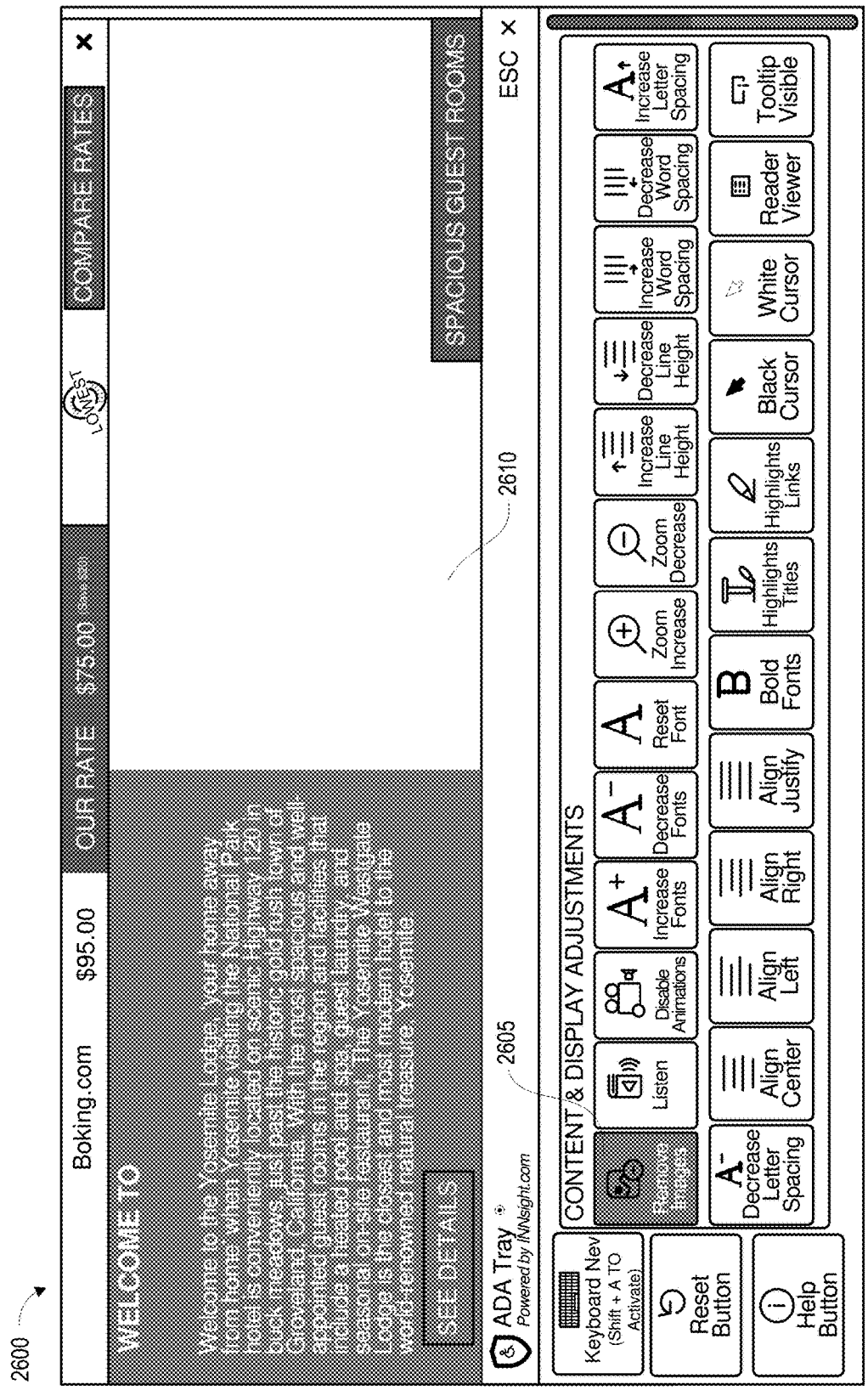
FIG. 26 is a screen shot that illustrates an implementation of the remove images accessibility module.

Referring to FIG. 26, FIG. 26 is a screen shot 2600 that illustrates an implementation of the remove images 166 accessibility module. Images on a web page may serve a variety of purposes, but may also be distracting for users with disabilities. The ability the toggle images off and on may allow users to remove such distractions and replace them at their leisure. A remove images button 2605, when selected, may activate the remove images 166 accessibility module to remove or replace images on a web page.

As shown by the highlighting in the screen shot 2600, the remove images button 2605 has been selected by a user. The images have been removed to leave blank space 2610, which allows the user to focus on the text or other objects of the web page. The user may select the remove images button 2605 again to replace the images.

Terms such as "including" and "comprising" are intended to refer to components or steps in a non-exclusive manner. All terms and claims are intended to be interpreted in the broadest manner that is consistent with the disclosure. The terms "component" and "module" do not limit features and functions to a single object or collection. They may also refer to features and functions that are distributed across many objects or collections and set in many locations.

What is claimed is:

1. A method for modifying a display, the method comprising:
    receiving, by a host server, a request for a web page accessibility component from a web page server;
    wherein the host server is a computing system in communication over a computer network with the web page server;
    receiving, by the host server, a web page component, from the web page server;
    adding, by the host server, the web page accessibility component, to the web page component;
    transmitting, by the host server, the web page component, comprising the web page accessibility component, to the web page server;
    wherein the web page accessibility component is configured by the host server to modify a web page content based on user input received at the host server;
    wherein the web page server is capable of transmitting, over a computer network, the web page component comprising the web page accessibility component to a client device to modify the web page content on a browser that runs on the client device;
    wherein the web page accessibility component is embedded before an end of one or more body tags of the web page component;
    wherein the web page accessibility component further comprises a plurality of modules that each provide different functionality, the plurality of modules comprising a custom accessibility module created by the host server based on content of the web page component;
    wherein the web page server is configured to control the functionality of each of the plurality of modules;
    wherein the web page server is configured to deliver one or more of the plurality of modules to a client device;
    wherein the web page server comprises an interface with selectable toggles that determine a subset of modules from the plurality of modules that are available on the client device;
    transmitting, by a web page usage tracker, details regarding a first frequency use data of each of the plurality of modules;
    identifying a first module that was least activated out of the plurality of modules; and
    moving, by the web page server, the first module from a primary web page, which is displayable on the client device, to a secondary web page, which is displayable on the client device, that is selectable by a user,
    wherein the web page usage tracker is included in the web page accessibility component, and is configured to track the time and URL address of the user each time one of the plurality of modules is used.

2. The method of claim 1, further comprising transmitting, by the host server, a content management component that is configured to display the details regarding the first frequency use data of each of the plurality of modules;
    further comprising optimizing of a functionality of the plurality of modules based on the details regarding the first frequency use data of each of the plurality of modules;
    wherein the optimizing further comprises analyzing the first frequency use data to identify a first module that was least activated out of the plurality of modules, moving the first module from a primary screen display to a secondary screen display that is selectable by a user;
    wherein the optimizing further comprises analyzing a second frequency use data that is gathered subsequent in time relative to the first frequency use data; and
    wherein analyzing the second frequency use data comprises identifying a second module that was least activated out of the plurality of modules that were displayed on the primary screen display, moving the second module from the primary screen display to a secondary screen display that is selectable by the user.

3. The method of claim 2, further comprising updating, by the host server, the web page accessibility component and transmitting an updated web page accessibility component to the web page server based on details regarding the frequency of use of each of the plurality of modules;
    further comprising receiving from a web page usage tracker a first frequency use data for each of the plurality of modules;
    further comprising optimizing a functionality of the web page accessibility component by analyzing a first frequency data to identify a first module that was least activated out of the plurality of modules, moving the first module from a primary screen display to a secondary screen display that is selectable by the user;
    wherein the optimizing further comprises analyzing a second frequency data that is gathered subsequent in time relative to the first frequency data; and
    wherein analyzing the second frequency data comprises identifying a second module that was least activated out of the plurality of modules that were displayed on the primary screen display.

4. The method of claim 1, wherein at least one of the plurality of modules modifies a functionality for a second module to operate on a functionality of a third module.

5. The method of claim 1, wherein two or more of the plurality modules modify a color contrast of the primary web page; and
    wherein the two or more of the plurality of modules comprise selectable buttons on the primary web page.

6. The method of claim 1, wherein at least one of the plurality of modules comprises a color filter; and
    wherein a color of the color filter is selectable by the user.

7. The method of claim 6, wherein the color filter highlights links within the web page content based on a selected color.

8. The method of claim 1, wherein at least one of the plurality of modules comprises one or more buttons that print text within the web page content.

9. The method of claim 1, wherein at least one of the plurality of modules comprises one or more buttons that displays a blank space in place of images within the web page content.

10. The method of claim 1, wherein the host server is configured to deliver web page accessibility components to multiple web page servers.

11. The method of claim 10, wherein the host server is further configured to:
determine one or more accessibility modules that are required for each of the multiple web page servers; and
automatically update each of the multiple web page servers with the one or more accessibility modules that are required.

12. An electronic device comprising:
a host server configured to receive a request for a web page accessibility component from a web page server;
the host server configured to receive a web page component, from the web page server;
wherein the host server is a computing system in communication over a computer network with the web page server;
the host server configured to add the web page accessibility component to the web page component;
the host server configured to transmit the web page component, comprising the web page accessibility component, to the web page server; and wherein the web page accessibility component is configured by the host server to modify a web page content based on user input received at the host server;
wherein the web page server is capable of transmitting, over a computer network, the web page component comprising the web page accessibility component to a client device to modify the web page content on a browser that runs on the client device;
wherein the web page accessibility component is embedded before an end of one or more body tags of the web page component;
wherein the web page accessibility component further comprises a plurality of modules that each provide different functionality, the plurality of modules comprising a custom accessibility module created by the host server based on content of the web page component;
wherein the web page server is configured to control the functionality of each of the plurality of modules;
wherein the web page server is configured to deliver one or more of the plurality of modules to a client device, wherein the web page server uses a toggle to select a subset of modules from the plurality of modules to make available on the client device;
wherein the web page accessibility component is configured to transmit details regarding a first frequency use data of each of the plurality of modules;
wherein the web page accessibility component is configured to identify a first module that was least activated out of the plurality of modules;
wherein the web page server is configured to move the first module from a primary web page, which is displayable on the client device, to a secondary web page, which is displayable on the client device, that is selectable by a user;
wherein the electronic device further comprises a web page usage tracker configured to transmit details regarding a frequency of use of each of the plurality of modules; and
wherein the web page usage tracker is included in the web page accessibility component, and is configured to track the time and URL address of the user each time one of the plurality of modules is used.

13. The electronic device of claim 12, wherein the host server is configured to transmit a content manager component that is configured to display details regarding a first frequency use data of each of the plurality of modules; and
wherein the host server is configured to optimize the functionality of the plurality of modules based on the details regarding the first frequency use data of each of the plurality of modules.

14. The electronic device of claim 13, wherein the host server is configured to analyze the first frequency use data to identify a first module that was least activated out of the plurality of modules, the host server is configured to move the first module from a primary screen display to a secondary screen display that is selectable by a user;
further comprising a secondary use data that is gathered subsequent in time relative to the first frequency use data; and
wherein the host server is configured to analyze a second frequency use data to identify a second module that was least activated out of the plurality of modules that were displayed on the primary screen display, the host server configured to move the second module from the primary screen display to a secondary screen display that is selectable by the user.

15. The electronic device of claim 14, further comprising:
the host server configured to update the web page accessibility component and transmit an updated web page accessibility component to the web page server based on details regarding the frequency of use of each of the plurality of modules.

16. The electronic device of claim 15, further comprising a host usage tracker that is configured to receive a first frequency use data for each of the plurality of modules;
wherein the host server is configured to optimize the functionality of the web page accessibility component by analyzing a first frequency data to identify a first module that was least activated out of the plurality of modules, the host server configured to move the first module from a primary screen display to a secondary screen display that is selectable by the user; and
wherein the host server is configured to analyze a second frequency data that is gathered subsequent in time relative to the first frequency data to identify a second module that was least activated out of the plurality of modules that were displayed on the primary screen display.

17. An electronic device, comprising:
a means for generating a web page accessibility component for a web page server;
a means for receiving a web page component from the web page server;
wherein the electronic device is a computing system in communication over a computer network with the web page server;
a means for adding the web page accessibility component to the web page component;
a means for transmitting the web page component, comprising the web page accessibility component, to the web page server;
wherein the web page server is capable of transmitting, over a computer network, the web page component comprising the web page accessibility component to a client device to modify the web page content on a browser that runs on the client device;
wherein the web page accessibility component is embedded before an end of one or more body tags of the web page component;
wherein the web page accessibility component comprises a plurality of modules that each provide different functionality, the plurality of modules comprising a custom accessibility module created by the electronic device based on content of the web page component;

wherein the web page server is configured to control the functionality of each of the plurality of modules;

wherein the web page accessibility component is configured to transmit details regarding a first frequency use data of each of the plurality of modules;

wherein the web page accessibility component is configured to identify a first module that was least activated out of the plurality of modules;

wherein the web page server is configured to deliver one or more of the plurality of modules to a client device, wherein the web page server uses a toggle to select a subset of modules from the plurality of modules to make available on the client device;

wherein the web page server is configured to move the first module from a primary web page, which is displayable on the client device, to a secondary web page, which is displayable on the client device, that is selectable by a user;

wherein the electronic device further comprises a web page usage tracker configured to transmit details regarding a frequency of use of each of the plurality of modules; and wherein the web page usage tracker is included in the web page accessibility component, and is configured to track the time and URL address of the user each time one of the plurality of modules is used.

18. The electronic device of claim 17, wherein the web page accessibility component further comprises a content manager component that is configured to display details regarding a first frequency use data of each of the plurality of modules.

19. The electronic device of claim 18, wherein the content manager component is configured to optimize the functionality of the plurality of modules based on the details regarding the first frequency use data of each of the plurality of modules; and wherein the content manager component is configured to analyze the first frequency use data to identify a first module that was least activated out of the plurality of modules, the content manager component is configured to move the first module from a primary screen display to a secondary screen display that is selectable by a user;

further comprising a secondary use data that is gathered subsequent in time relative to the first frequency use data; and wherein the content manager component is configured to analyze a second frequency use data to identify a second module that was least activated out of the plurality of modules that were displayed on the primary screen display, the content manager component configured to move the second module from the primary screen display to a secondary screen display that is selectable by the user.

20. The electronic device of claim 17, wherein the web page accessibility component further comprises:

a host usage tracker that is configured to receive a first frequency use data for each of the plurality of modules;

the web page accessibility component further comprises a content manager component configured to optimize the functionality of the web page accessibility component by analyzing the first frequency data to identify a first module that was least activated out of the plurality of modules, the content manager component configured to move the first module from a primary screen display to a secondary screen display that is selectable by the user; and wherein the content manager component is configured to analyze a second frequency data that is gathered subsequent in time relative to the first frequency data to identify a second module that was least activated out of the plurality of modules that were displayed on the primary screen display.

* * * * *